US012207124B2

(12) United States Patent
Ajami et al.

(10) Patent No.: US 12,207,124 B2
(45) Date of Patent: Jan. 21, 2025

(54) DYNAMIC SELECTION OF PARAMETERS FOR ENHANCED QUALITY OF SERVICE (QOS) AND RELIABILITY

(71) Applicant: QUALCOMM Incorporated, San Diego, CA (US)

(72) Inventors: Abdel Karim Ajami, San Diego, CA (US); Alfred Asterjadhi, San Diego, CA (US); Sai Yiu Duncan Ho, San Diego, CA (US); George Cherian, San Diego, CA (US); Abhishek Pramod Patil, San Diego, CA (US); Yanjun Sun, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 17/544,932

(22) Filed: Dec. 7, 2021

(65) Prior Publication Data

US 2023/0180047 A1 Jun. 8, 2023

(51) Int. Cl.
*H04W 28/02* (2009.01)
*H04W 52/02* (2009.01)
*H04W 72/542* (2023.01)

(52) U.S. Cl.
CPC ... *H04W 28/0221* (2013.01); *H04W 52/0216* (2013.01); *H04W 72/542* (2023.01)

(58) Field of Classification Search
None
See application file for complete search history.

(56) References Cited

U.S. PATENT DOCUMENTS

2014/0235234 A1* 8/2014 Jang ............... H04W 76/25
455/552.1
2015/0173014 A1* 6/2015 Lee ............... H04W 52/0216
370/311

(Continued)

FOREIGN PATENT DOCUMENTS

WO WO-2018236422 A1 12/2018
WO WO-2019174557 A1 9/2019

OTHER PUBLICATIONS

International Search Report and Written Opinion—PCT/US2022/044745—ISA/EPO—Dec. 14, 2022.

(Continued)

*Primary Examiner* — Hassan A Phillips
*Assistant Examiner* — Gautam Sharma
(74) *Attorney, Agent, or Firm* — Holland & Hart / QUALCOMM Incorporated

(57) ABSTRACT

This disclosure provides methods and devices for managing the allocation of resources for uplink (UL) and downlink (DL) transmissions associated with a scheduled time period. In some implementations, a wireless station (STA) transmits, to an access point (AP), a request frame indicating a bandwidth or a quantity of spatial streams (or both) for the UL transmissions, and indicating a bandwidth or a quantity of spatial streams (or both) for the DL transmissions. In some instances, the request frame also may indicate the STA's intention to transmit UL data as duplicates carried on different communication links. The STA receives a trigger frame indicating that the STA is scheduled to transmit or receive data during the time period. The STA transmits data to, or receives data from, one or more other devices during the time period.

26 Claims, 17 Drawing Sheets

(56) References Cited

U.S. PATENT DOCUMENTS

| | | | | |
|---|---|---|---|---|
| 2016/0100408 | A1* | 4/2016 | Hedayat | H04L 5/0037 |
| | | | | 370/329 |
| 2016/0249383 | A1* | 8/2016 | Kwon | H04W 72/23 |
| 2017/0162361 | A1* | 6/2017 | Jing | H01J 37/045 |
| 2019/0045438 | A1* | 2/2019 | Cariou | H04W 52/0219 |
| 2019/0053155 | A1* | 2/2019 | Kneckt | H04W 72/23 |
| 2019/0082443 | A1* | 3/2019 | Li | H04W 28/0278 |
| 2019/0306685 | A1* | 10/2019 | Cariou | H04W 72/0446 |
| 2021/0045192 | A1* | 2/2021 | Das | H04W 88/08 |
| 2021/0352722 | A1* | 11/2021 | Xin | H04W 72/56 |
| 2022/0124684 | A1* | 4/2022 | Segev | H04L 67/1059 |
| 2022/0264566 | A1* | 8/2022 | Chu | H04W 74/0816 |
| 2022/0417787 | A1* | 12/2022 | Fang | H04W 28/0268 |
| 2023/0011167 | A1* | 1/2023 | Chitrakar | H04L 1/1635 |
| 2023/0058871 | A1* | 2/2023 | Xin | H04W 74/0816 |
| 2023/0180047 | A1* | 6/2023 | Ajami | H04W 74/006 |
| | | | | 370/230 |
| 2023/0261987 | A1* | 8/2023 | Zhu | H04L 47/72 |
| | | | | 370/389 |

OTHER PUBLICATIONS

Liwen C (NXP): "CC36 Comment Resolution: Triggered TXOP Sharing", IEEE Draft, 11-21-1509-00-00BE-CC36-Comment-Resolution-Triggered-TXOP-Sharing, IEEE-SA Mentor, Piscataway, NJ, USA, vol. 802.11 EHT, 802.11be, Sep. 13, 2021, pp. 1-11, Aug. 20, 2020, XP068184911, Oct. 2021, The Whole Document, p. 3.

* cited by examiner

800A

| Subfield Values | | Triggered Operations | |
|---|---|---|---|
| UL MU Disable | UL MU Data Disable | Action by APs without Rx support for UL MU Data Disable | Action by APs with Rx Support for UL MU Data Disable |
| 0 | 0 | All trigger-based UL MU transmissions enabled | All trigger-based UL MU transmissions enabled |
| 0 | 1 | Invalid State | Basic Trigger frames disabled; MU-RTS TXS Trigger frames allowed |
| 1 | 0 | All trigger-based UL transmissions suspended | All trigger-based UL transmissions suspended |
| 1 | 1 | Basic Trigger frames disabled; AP uses MU-RTS TXS Trigger frames to solicit UL SU data | Basic Trigger frames disabled; AP uses MU-RTS TXS Trigger frames to solicit UL SU data |

| Subfield Values | | Triggered Operations | |
|---|---|---|---|
| UL MU Disable | UL MU Data Disable | Action by APs without Rx support for UL MU Data Disable | Action by APs with Rx support for UL MU Data Disable |
| 0 | 0 | All trigger-based UL MU transmissions enabled | All trigger-based UL MU transmissions enabled |
| 0 | 1 | Invalid State | Basic Trigger frames disabled; MU-RTS TXS Trigger frames allowed |
| 1 | 0 | All trigger-based UL transmissions suspended | All trigger-based UL transmissions suspended |
| 1 | 1 | MU-RTS TXS Trigger frames disabled; Basic Trigger frames enabled to solicit UL MU data | MU-RTS TXS Trigger frames disabled; Basic Trigger frames enabled to solicit UL MU data |

*Figure 8B*

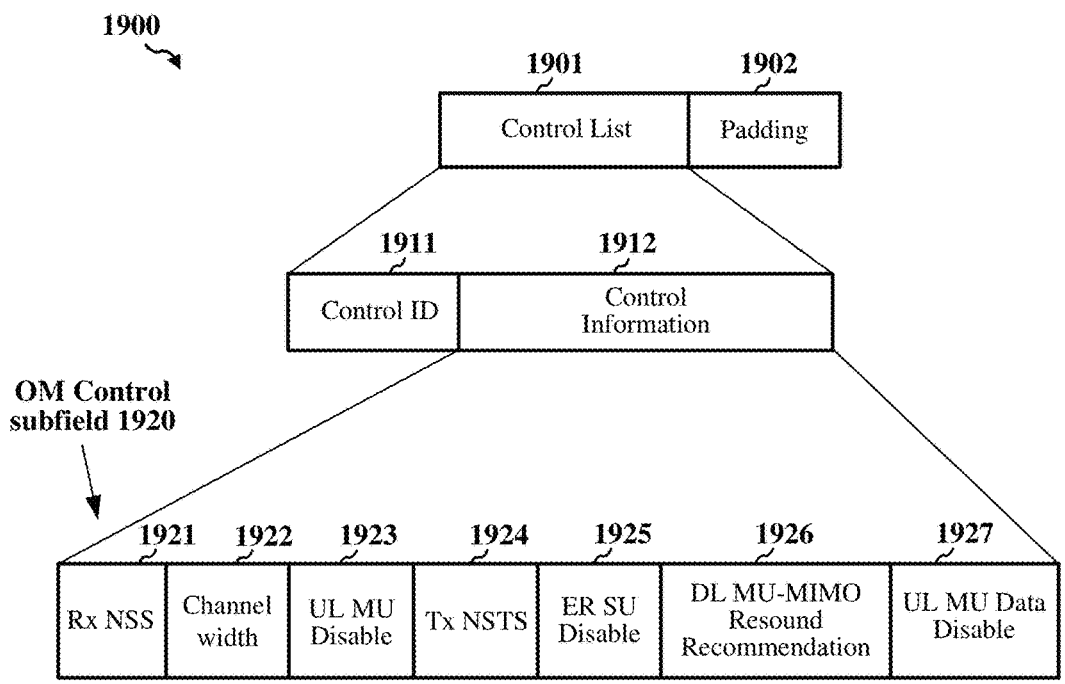

DYNAMIC SELECTION OF PARAMETERS FOR ENHANCED QUALITY OF SERVICE (QOS) AND RELIABILITY

TECHNICAL FIELD

This disclosure relates generally to wireless communication, and more specifically, to dynamically scheduling resources of a shared wireless medium for latency-sensitive traffic and peer-to-peer (P2P) communications.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless communication device. The wireless communication device can include a processing system coupled to an interface. In some implementations, the interface may be configured to transmit a first frame to an access point (AP), the first frame indicating a bandwidth for uplink (UL) transmissions associated with a time period and a bandwidth for downlink (DL) transmissions associated with the time period. The interface may be configured to receive a trigger frame from the AP, the trigger frame indicating that the wireless communication device is scheduled to transmit or receive data during the time period. The interface may be configured to transmit data to, or receive data from, one or more other wireless communication devices during at least the time period. In some instances, the indicated bandwidth for UL transmissions may be different than the indicated bandwidth for DL transmissions. In other instances, the indicated bandwidth for UL transmissions may be the same as, or similar to, the indicated bandwidth for DL transmissions.

In some implementations, the first frame may be a Target Wake Time (TWT) request frame including a request for the AP to schedule a TWT service period (SP) for latency-sensitive traffic or peer-to-peer (P2P) communications associated with the wireless communication device. The TWT request frame may indicate a quantity of spatial streams for UL transmissions during the TWT SP, and may indicate a quantity of spatial streams for DL transmissions during the TWT SP. In some aspects, the TWT request frame also may indicate a periodicity associated with the indicated bandwidths and the indicated quantities of spatial streams. In other aspects, the TWT request frame also may indicate an intention of the wireless communication device to transmit UL data using duplicates carried on a plurality of communication links.

In some other implementations, the first frame may be a Stream Classification Service (SCS) request frame including a request for the AP to create an SCS stream for a class of traffic associated with a Quality-of-Service (QoS) period. The SCS request frame may indicate a quantity of spatial streams for UL transmissions during the QoS period, and may indicate a quantity of spatial streams for DL transmissions during the QoS period. In some aspects, the SCS request frame also may indicate a periodicity associated with the indicated bandwidths and the indicated quantities of spatial streams. In other aspects, the SCS request frame also may indicate an intention of the wireless communication device to transmit UL data using duplicates carried on a plurality of communication links.

Another innovative aspect of the subject matter described in this disclosure can be implemented as a method of wireless communication by a wireless communication device. In some implementations, the method includes transmitting a first frame to an AP, the first frame indicating a bandwidth for UL transmissions associated with a time period and a bandwidth for DL transmissions associated with the time period. The method includes receiving a trigger frame from the AP, the trigger frame indicating that the wireless communication device is scheduled to transmit or receive data during the time period. The method includes transmitting data to, or receiving data from, one or more other wireless communication devices during at least the time period. In some instances, the indicated bandwidth for UL transmissions may be different than the indicated bandwidth for DL transmissions. In other instances, the indicated bandwidth for UL transmissions may be the same as, or similar to, the indicated bandwidth for DL transmissions.

In some implementations, the first frame may be a TWT request frame including a request for the AP to schedule a TWT service period SP for latency-sensitive traffic or P2P communications associated with the wireless communication device. The TWT request frame may indicate a quantity of spatial streams for UL transmissions during the TWT SP, and may indicate a quantity of spatial streams for DL transmissions during the TWT SP. In some instances, the TWT request frame also may indicate a periodicity associated with the indicated bandwidths and the indicated quantities of spatial streams. In other instances, the TWT request frame also may indicate an intention of the wireless communication device to transmit UL data using duplicates carried on a plurality of communication links.

In some other implementations, the first frame may be an SCS request frame including a request for the AP to create an SCS stream for a class of traffic associated with a QoS period. The SCS request frame may indicate a quantity of spatial streams for UL transmissions during the QoS period, and may indicate a quantity of spatial streams for DL transmissions during the QoS period. In some instances, the SCS request frame also may indicate a periodicity associated with the indicated bandwidths and the indicated quantities of spatial streams. In other instances, the SCS request frame also may indicate an intention of the wireless communication device to transmit UL data using duplicates carried on a plurality communication links.

Details of one or more implementations of the subject matter described in this disclosure are set forth in the accompanying drawings and the description herein. Other features, aspects, and advantages will become apparent from the description, the drawings, and the claims.

BRIEF DESCRIPTION OF THE DRAWINGS

FIG. 8A shows a table indicating a first set of triggered operations based on values of reserved bits in the UL MU Disable subfield and the UL MU Data Disable subfield of an Operating Mode (OM) Control subfield usable for wireless communications.

FIG. 8B shows a table indicating a second set of triggered operations based on values of reserved bits in the UL MU Disable subfield and the UL MU Data Disable subfield of the OM Control subfield usable for wireless communications.

FIG. 18 shows an example structure of a Medium Access Control (MAC) header usable for wireless communications that support TXOP sharing requests.

FIG. 19 shows an example structure of an Aggregated-Control (A-Control) subfield usable in the MAC header of FIG. 18.

FIG. 20 shows an example structure of a Stream Classification Service (SCS) request frame usable for wireless communications that support TXOP sharing requests.

Like reference numbers and designations in the various drawings indicate like elements.

DETAILED DESCRIPTION

Figure 1:
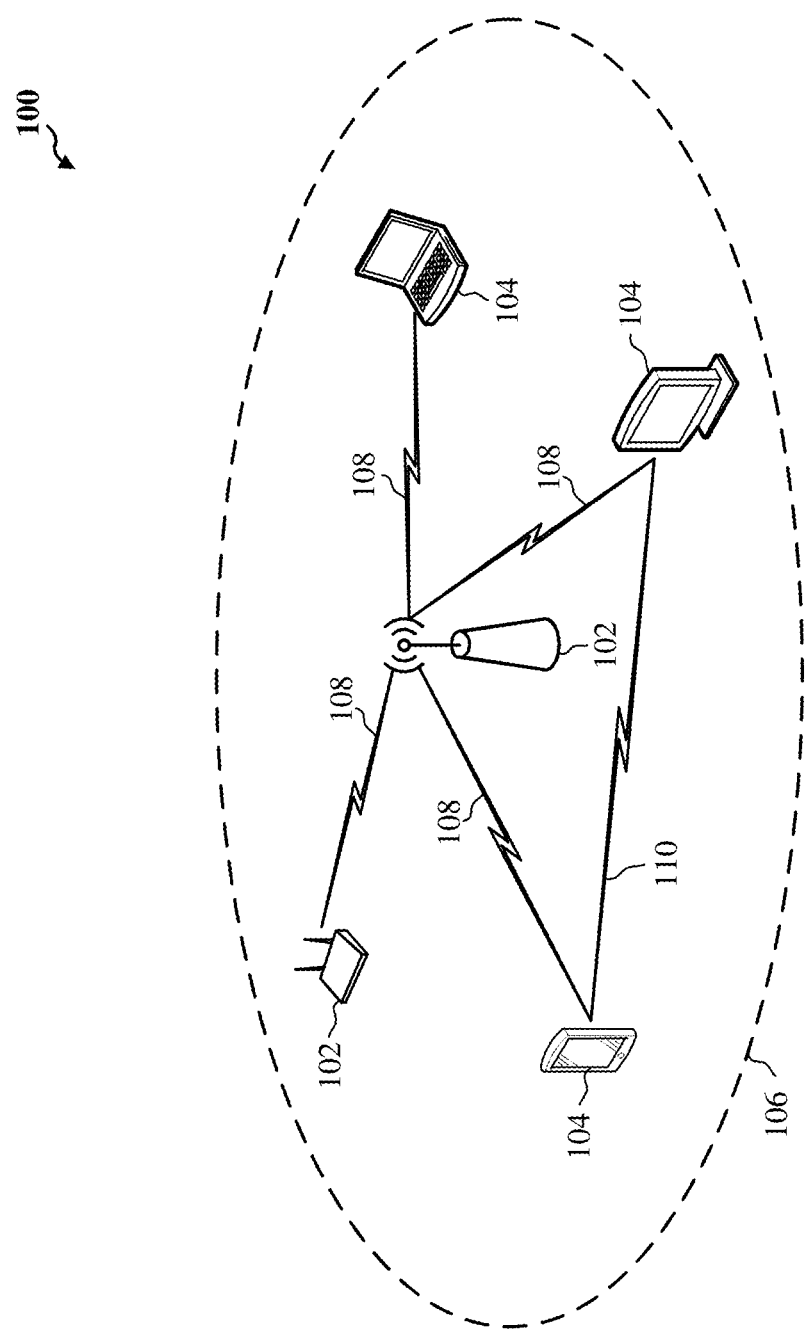
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Many wireless networks use random channel access mechanisms to control access to a shared wireless medium. In these wireless networks, wireless communication devices (including access points (APs) and wireless stations (STAs)) contend with one another using carrier sense multiple access with collision avoidance (CSMA/CA) techniques to gain access to the wireless medium. In general, the wireless communication device that randomly selects the lowest back-off number (RBO) wins the medium access contention operation and may be granted access to the wireless medium for a period of time commonly referred to as a transmit opportunity (TXOP). Other wireless communication devices are generally not permitted to transmit during the TXOP of another wireless communication device to avoid collisions on the shared wireless medium.

Some random channel access mechanisms, such as enhanced distributed channel access (EDCA), afford high-priority traffic a greater likelihood of gaining medium access than low-priority traffic. EDCA classifies data into different access categories (ACs) such as, for example, voice (AC_VO), video (AC_VI), best effort (AC_BE), and background (AC_BK). Each AC is associated with a different priority level and may be assigned a different range of RBOs so that higher priority data is more likely to win a TXOP than lower priority data (such as by assigning lower RBOs to higher priority data and assigning higher RBOs to lower priority data). Although EDCA increases the likelihood that low-latency data traffic will gain access to a shared wireless medium during a given contention period, unpredictable outcomes of medium access contention operations may prevent low-latency applications from achieving certain levels of throughput or satisfying certain latency requirements.

The IEEE 802.11be amendment of the IEEE 802.11 standard describes a restricted target wake time (TWT) service period (SP) that can be used to provide more predictable latency, reduced worst case latency, or reduced jitter, with higher reliability for latency-sensitive traffic. As used herein, the term "non-legacy STA" may refer to any STA that supports restricted TWT operation, while the term "low-latency STA" may refer to any non-legacy STA that has latency-sensitive traffic to send or receive. In contrast, the term "legacy STA" may refer to any STA that does not support restricted TWT operation or that does not support disabling UL MU data transmissions. The IEEE 802.11be amendment requires all non-legacy STAs that are TXOP holders outside of any restricted TWT SP (r-TWT SP) for which they are not a member ("non-member STAs") to end their respective TXOPs before the start of the r-TWT SP. Although membership in a r-TWT SP may be reserved exclusively for low-latency STAs, the current rules regarding r-TWT SPs do not prevent non-member STAs from acquiring a TXOP during a r-TWT SP. As a result, some non-member STAs may gain access to a shared wireless medium, during a r-TWT SP, even before the members of the r-TWT SP are able to obtain channel access.

Some latency-sensitive traffic may be exchanged between wireless devices using peer-to-peer (P2P) communications. For example, a wireless communication device, such as a non-AP STA, executing a real-time gaming application may operate as a STA that transmits gaming data to, and receives gaming data from, a gaming service via an associated AP via an access link, while also operating as a softAP that transmits gaming data to, and receives gaming data from, an associated AR/VR headset (or another suitable client device) via a P2P link. While the wireless communication device is executing the real-time gaming application, the P2P communications between the STA and the AR/VR headset may be subject to the latency, throughput, and timing requirements associated with the gaming application. Similarly, gaming data transmitted between the STA and the associated AP also may be subject to the latency, throughput, and timing requirements associated with the gaming application.

Although latency-sensitive traffic may be afforded enhanced channel protection using r-TWT SPs, real-time gaming traffic (and other types of latency-sensitive traffic) may benefit from an ability to dynamically request additional wireless resources from the associated AP. For example, if the STA executing the real-time gaming application admits additional players to the gaming application, the quantity of gaming data transmitted to, and the quantity of gaming data transmitted from, the STA may suddenly increase and require additional resources to avoid violating the latency, throughput, and timing requirements associated with the gaming application. For another example, if the real-time gaming application suddenly begins receiving a high-definition video stream from an online server, the quantity of DL gaming data may suddenly increase while the quantity of UL gaming data remains relatively constant, thereby requiring additional resources only for DL transmissions.

Various aspects of the subject matter disclosed herein relate generally to wireless communications associated with latency-sensitive applications or P2P communications, or both, and specifically, to allowing STAs to dynamically adjust the UL resources and DL resources during a time period to meet the various latency, throughput, and timing requirements of such latency-sensitive applications or P2P communications, or both. In various implementations, a STA can indicate or specify resource allocations for UL and DL transmissions associated with the latency-sensitive application or P2P communications independently of one another. In some implementations, the STA can indicate or specify the bandwidth for DL transmissions, the quantity of spatial streams used to carry the DL transmissions, the bandwidth for UL transmissions, the quantity of spatial streams used to carry the UL transmissions, and periodicity information pertaining to the indicated bandwidths and quantities of spatial streams. In some instances, the STA also can indicate an intention to transmit UL data using duplicates carried on a plurality of communication links.

Particular implementations of the subject matter described in this disclosure can be implemented to realize one or more of the following potential advantages. By enabling a wireless communication device, such as a STA, to indicate or specify resource allocations for UL and DL transmissions associated with a latency-sensitive application or P2P communications independently of one another, aspects of the present disclosure may allow the UL and DL resources to be managed with greater specificity than existing amendments to the IEEE 802.11 family of wireless communication standards. Also, by allowing the STA to dynamically adjust the UL resource allocations or the DL resource allocations (or both), aspects of the present disclosure may ensure that the STA is allocated sufficient DL and UL resources to meet any associated latency, throughput, and timing requirements, particularly when one or more of traffic flows, traffic patterns, or traffic classifications of a latency-sensitive application or P2P communication may change in real-time. The ability to dynamically adjust one or more of the UL resource allocations, the DL resource allocations, the operating mode of the STA (such as between single-user and multi-user modes), the timing parameters, or the transmission of UL data duplicates over different communication links also may increase the communication's reliability, reduce power consumption, or both. Also, by allowing STAs that do not support UL MU transmissions to transmit UL data during the time period using UL SU transmissions, aspects of the present disclosure may allow limited-capability STAs to support at least some QoS features.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
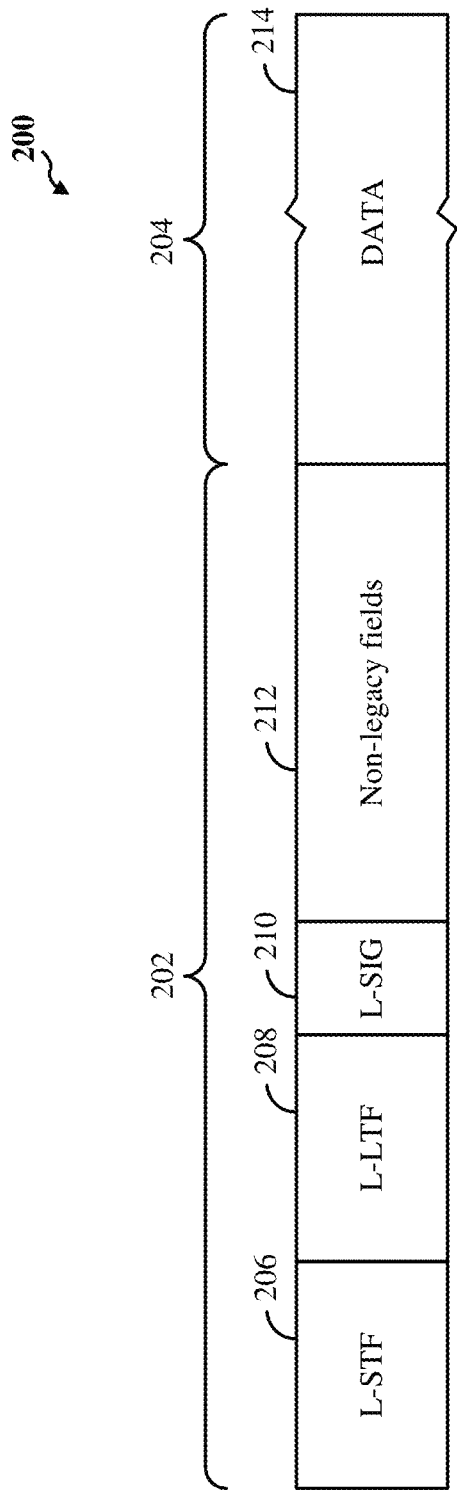
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
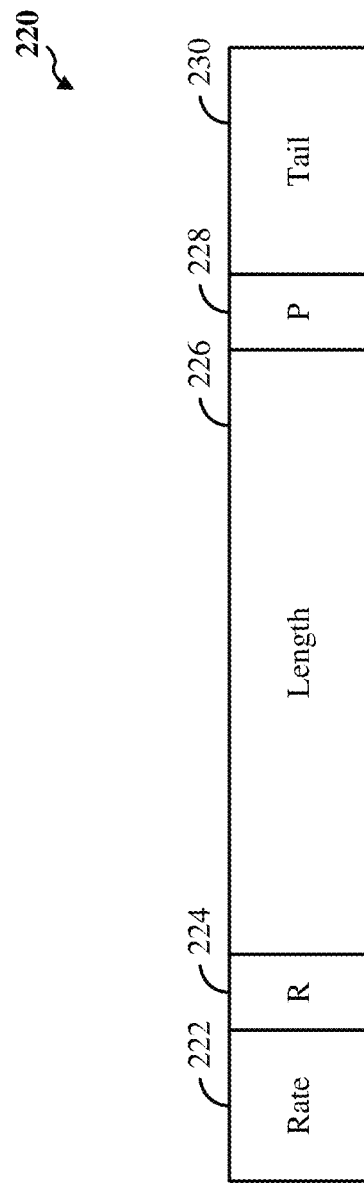
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
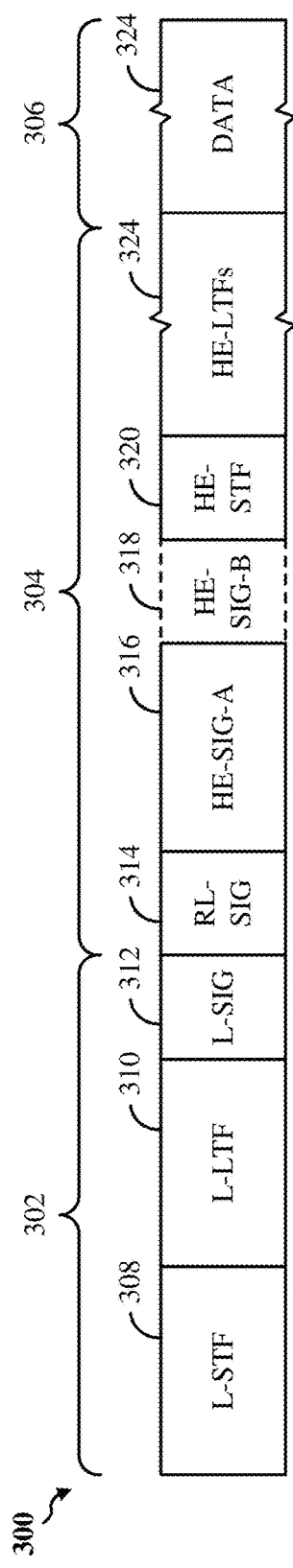
FIG. 3A shows another example PDU usable for communications between an AP and one or more STAs.

FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the non-legacy portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-B 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
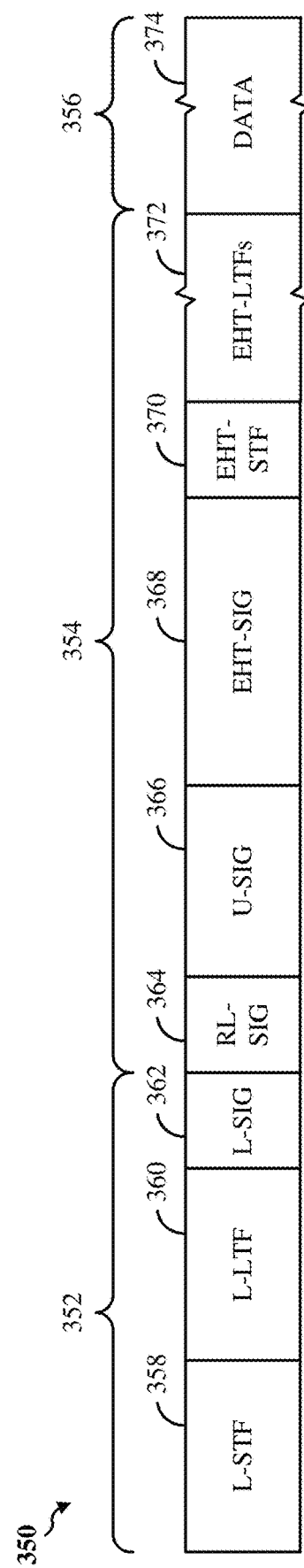
FIG. 3B shows another example PDU usable for communications between an AP and one or more STAs.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 376.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 372 (referred to herein as "EHT-STF 372," although it may be structured as, and carry version-dependent information for, other wireless communication protocol versions beyond EHT) and one or more additional long training fields 374 (referred to herein as "EHT-LTFs 374," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 376. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure 4:
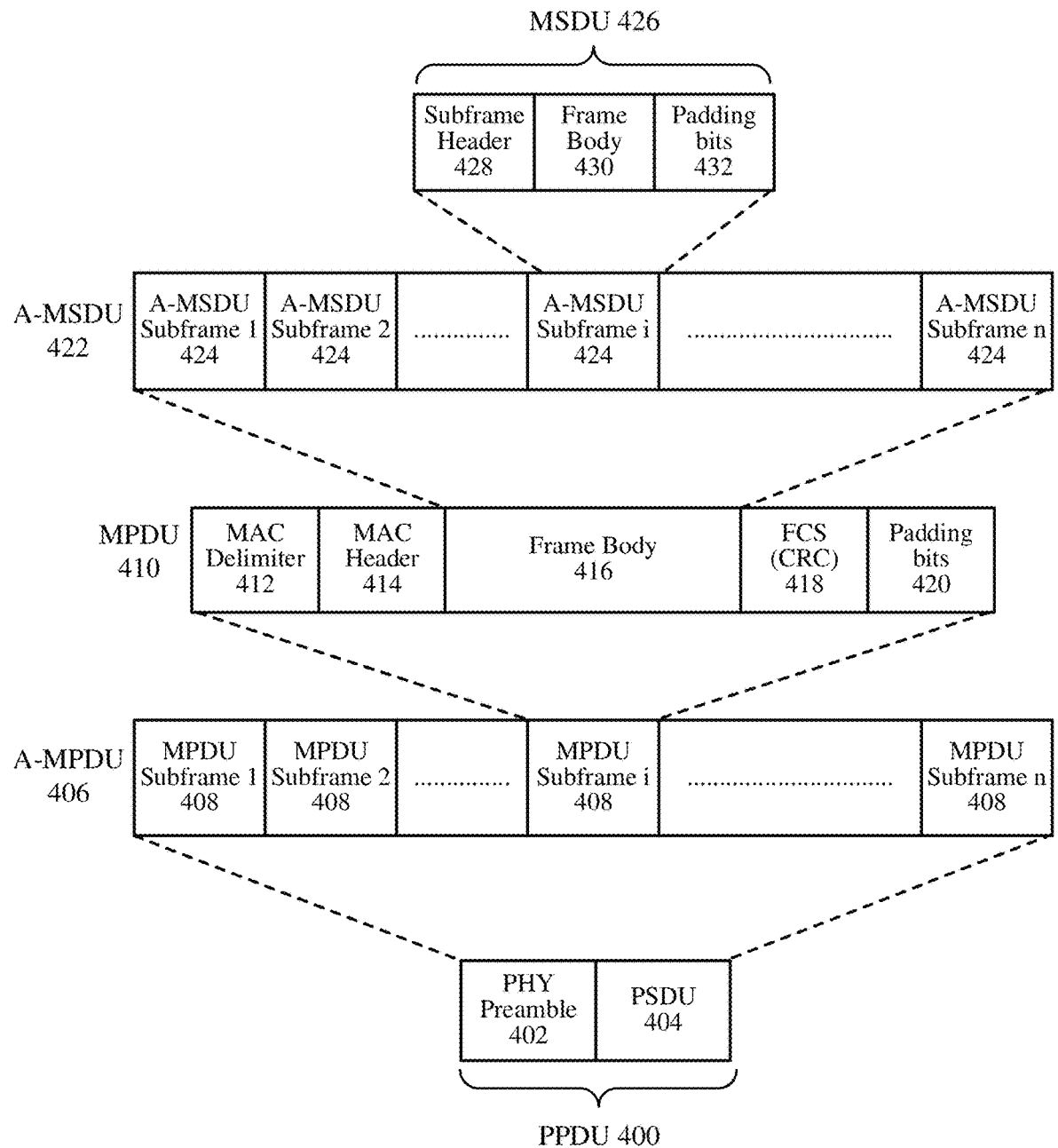
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs), for example, such as an aggregated MPDU (A-MPDU) 406 that includes multiple MPDU subframes 408. Each MPDU subframe 408 may include a MAC delimiter 412 and a MAC header 414 prior to the accompanying frame body 416, which includes the data portion or "payload" of the MPDU subframe 408. The frame body 416 may carry one or more MAC service data units (MSDUs), for example, such as an aggregated MSDU (A-MSDU) 422 that includes multiple MSDU subframes 424. Each MSDU subframe 424 contains a corresponding MSDU 426 including a subframe header 428, a frame body 430, and one or more padding bits 432.

Referring back to the A-MPDU subframe 406, the MAC header 414 may include a number of fields containing information that defines or indicates characteristics or attributes of data encapsulated within the frame body 416. The MAC header 414 also includes a number of fields indicating addresses for the data encapsulated within the frame body 416. For example, the MAC header 414 may include a combination of a source address, a transmitter address, a receiver address, or a destination address. The MAC header 414 may include a frame control field containing control information. The frame control field specifies the frame type, for example, a data frame, a control frame, or a management frame. The MAC header 414 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 408 also may include a frame check sequence (FCS) field 418 for error detection. For example, the FCS field 418 may include a cyclic redundancy check (CRC), and may be followed by one or more padding bits 420.

As described above, APs 102 and STAs 104 can support multi-user (MU) communications. That is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
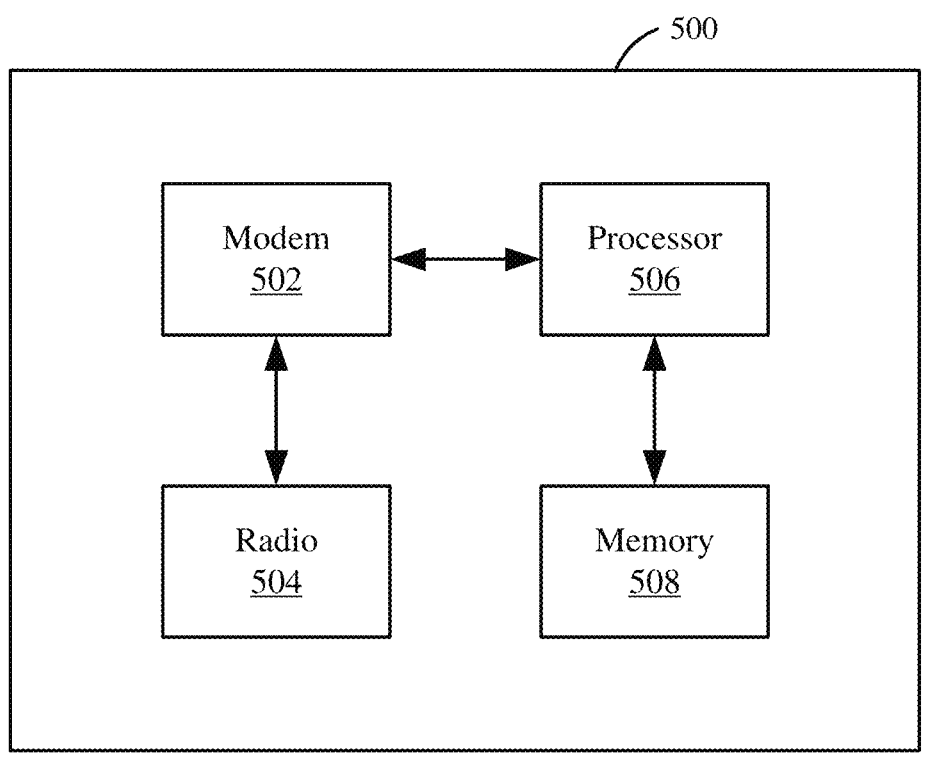
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device 500 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 500 further includes one or more processors, processing blocks or processing elements (collectively "the processor 506"), and one or more memory blocks or elements (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which transmits the symbols via the coupled antennas. Similarly, symbols received via the antennas are obtained by the radio 504, which provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 6B:
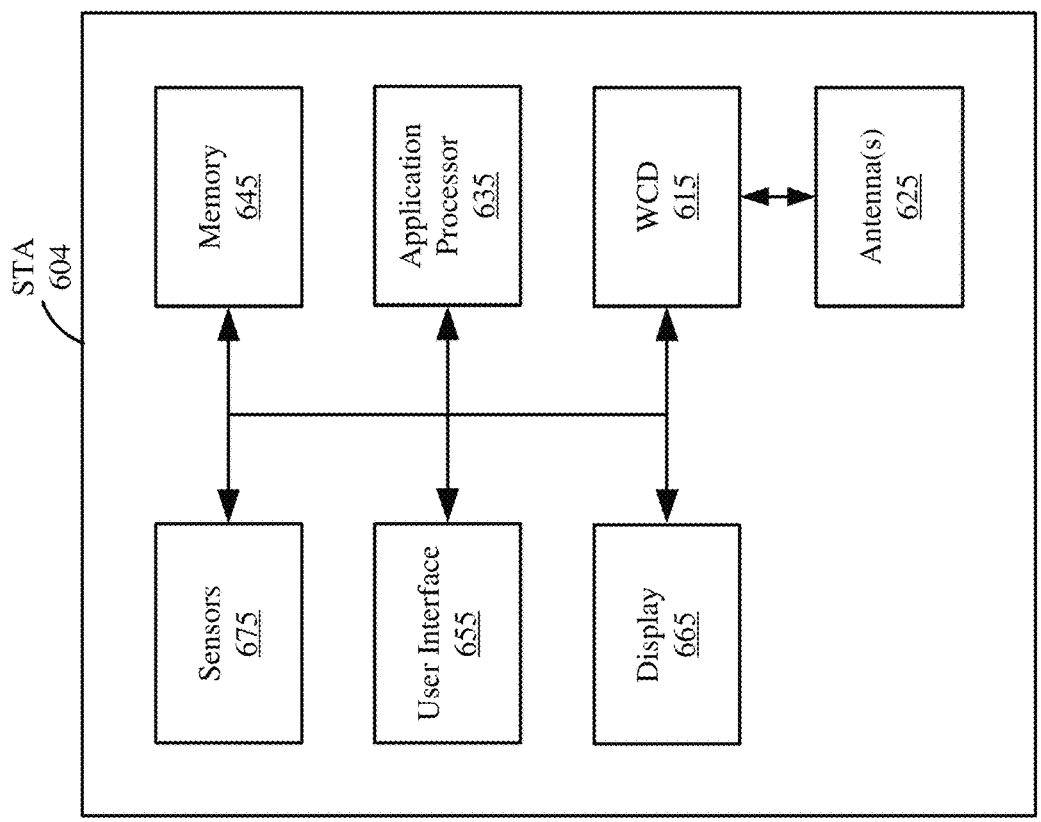
FIG. 6B shows a block diagram of an example station (STA).
Figure 6A:
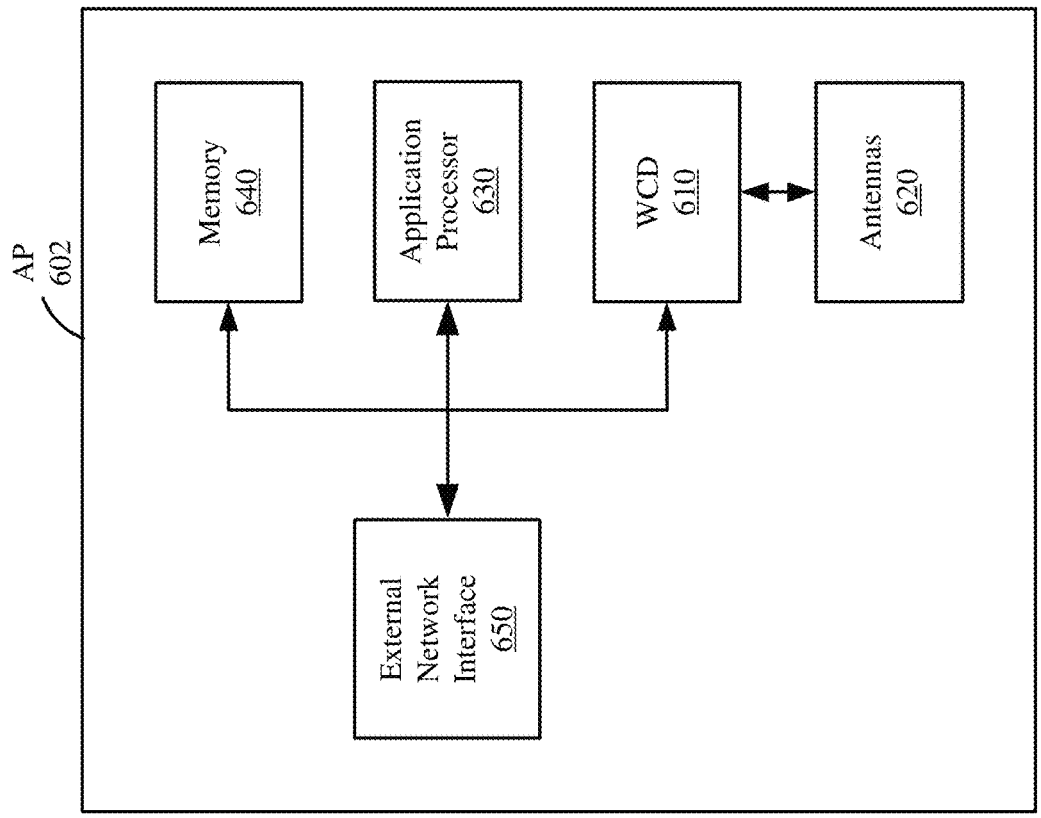
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630.

The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

Figure 7:
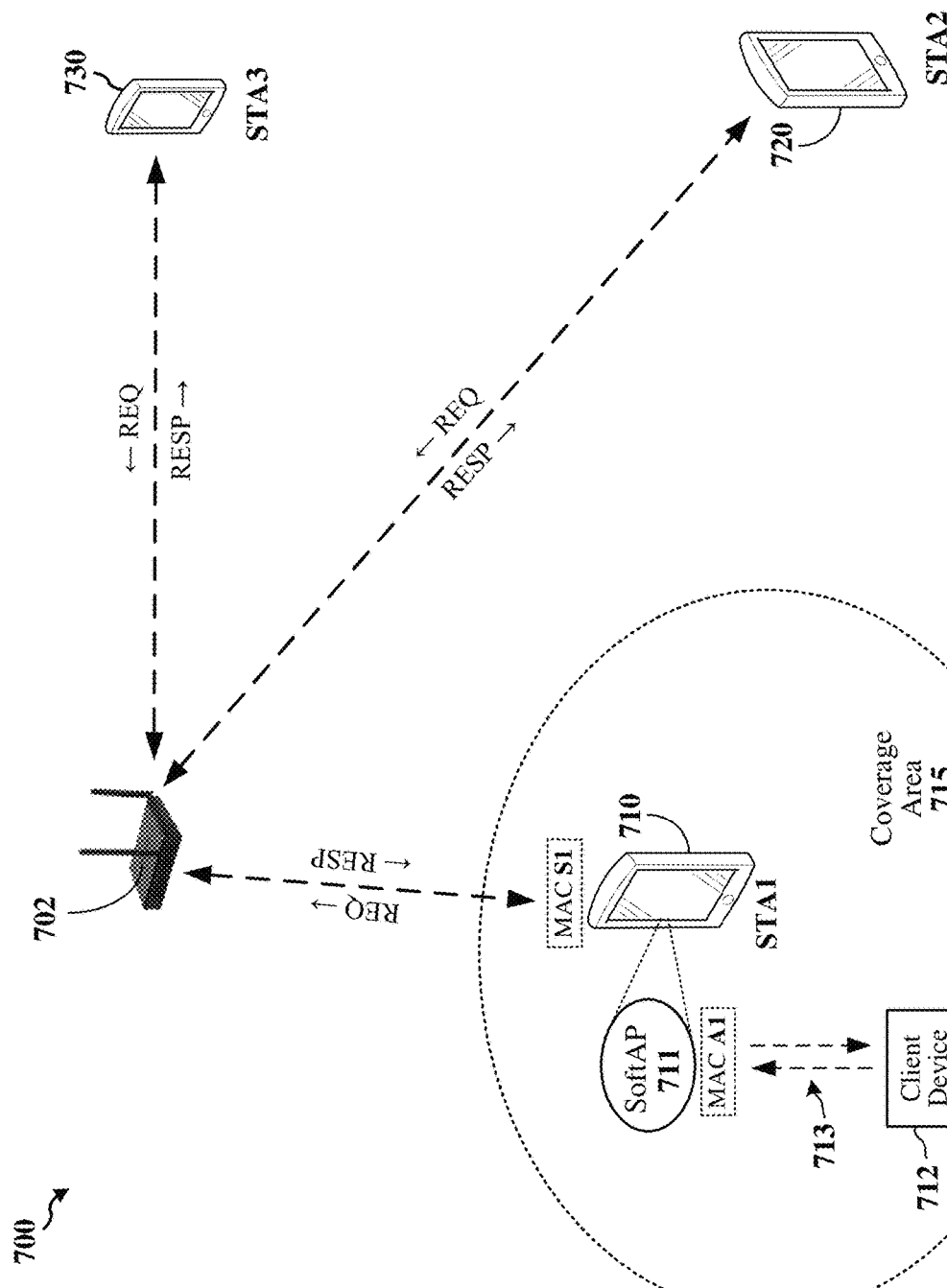
FIG. 7 shows a pictorial diagram of another example wireless network.

FIG. 7 shows a block diagram of another example wireless network 700. In some aspects, the wireless network 700 can be an example of the WLAN 100 of FIG. 1. The wireless network 700 is shown to include an AP 702, a first wireless station (STA) 710, a second STA 720, and a third STA 730. In some implementations, the AP 702 may be one example of the AP 102 of FIG. 1 or the AP 602 of FIG. 6A, and may operate a BSS on a wireless medium according to one or more versions of the IEEE 802.11 family of wireless communication standards. The STAs 710, 720, and 730 may be examples of the STAs 104 of FIG. 1, the wireless communication device 500 of FIG. 5, or the STA 604 of FIG. 6B. The STAs 710, 720, and 730 are associated with the AP 702, and may communicate with the AP 702 on the wireless medium in accordance with the BSS operated by the AP 702.

In the example of FIG. 7, the first STA 710 is collocated with a softAP 711 that is associated with a client device 712. The softAP 711 and the client device 712 may establish a P2P link 713 over which P2P communications can be exchanged between the softAP 711 and the client device 712. In some instances, the P2P link 713 may be a tunneled direct-link setup (TDLS) link established on the wireless medium. In other instances, the P2P link 713 may be based on the Wi-Fi Direct peer-to-peer communication protocol.

In some implementations, the first STA 710 includes separate MAC entities that can independently perform MAC layer functions for wireless communications with the AP 702 and MAC layer functions for wireless communications with the client device 712. For example, the first STA 710 may include a first MAC service access point (MAC-SAP) endpoint (S1) corresponding to the first STA 710, and may include a second MAC-SAP endpoint (A1) corresponding to the softAP 711. The first MAC-SAP endpoint S1 may be responsible for decoding frames and packets received over the wireless medium from the AP 702, and may be responsible for constructing and formatting frames for transmission over the wireless medium from the first STA 710 to the AP 702. The second MAC-SAP endpoint A1 may be responsible for decoding frames and packets received over the P2P link 713 from the client device 712, and may be responsible for constructing and formatting frames for transmission from the softAP 711 to the client device 712 over the P2P link 713. In some instances, the MAC-SAP endpoints S1 and A1 may have different MAC addresses.

The first STA 710 may provide a coverage area 715 for P2P devices such as the client device 712. Although not shown for simplicity, the coverage area provided by the AP 702 may include some or all of the coverage area 715 provided by the softAP 711 of the first STA 710. For example, in some instances, the client device 712 may be able to receive and successfully decode frames transmitted by the AP 702, while in other instances, the client device 712 may not be able to receive and successfully decode frames transmitted by the AP 702 (such as because the client device 712 is not within the wireless coverage area of the AP 702).

The client device 712 can be any suitable device (including peripheral devices such as headsets, headphones, earbuds, wearables, etc.) that can establish a P2P link with the softAP 711. In the example of FIG. 7, the client device 712 is associated with latency-sensitive traffic having strict end-to-end latency, throughput, and timing requirements. In some instances, the client device 712 may be associated with real-time gaming applications, video communications, or augmented reality (AR) and virtual reality (VR) applications (collectively referred to as extended reality (XR) applications). For example, the client device 712 may be AR/VR headsets associated with the softAP 711 collocated with the first STA 710. In some instances, the first STA 710 may be referred to as a low-latency STA. In instances for which the second STA 720 and the third STA 730 are associated with latency-sensitive traffic, the second STA 720 and the third STA 730 also may be referred to as low-latency STAs.

As discussed, latency-sensitive applications may specify various latency, throughput, and timing requirements for the wireless network 700, and therefore it is desirable to ensure that the wireless network 700 is able to meet the various latency, throughput, and timing requirements of such latency-sensitive applications. In various implementations, STAs such as the STAs 710, 720, and 730 can separately indicate or specify the resources needed for uplink (UL) and downlink (DL) transmissions associated with a traffic flow or latency-sensitive application with greater specificity than the existing amendments to the IEEE 802.11 family of wireless communication standards. For example, the STAs can transmit, to the AP 702, a request frame that indicates a bandwidth for UL transmissions during a time period, a bandwidth for DL transmissions during the time period, a quantity of spatial streams used to carry UL transmissions during the time period, a quantity of spatial streams used to carry DL transmissions during the time period, and periodicity information associated with the indicated bandwidths and quantities of spatial streams.

In some implementations, the STAs can request the AP 702 to dynamically change or update resource allocations for one or both of the UL and DL transmissions based on real-time changes in traffic flows, patterns, or classifications. For example, when a streaming app running on a STA switches from a low-resolution video stream to a high-definition (HD) or ultrahigh-definition (UHD) video stream, the quantity of DL data transmitted to the STA may significantly increase while the quantity of UL data transmitted from the STA remains relatively constant. As such, to meet the latency and throughput requirements associated with the streaming app, the STA may request an increase in the bandwidth allocated for DL transmissions or request an increase in the quantity of spatial streams used to carry the DL data based on the real-time increase in DL data transmitted to the STA. As a non-limiting example, the STA may initially request or indicate a 20 MHz channel and 2 spatial streams for DL transmissions associated with an indicated traffic stream. When the quantity of DL data transmitted to the STA increases, the STA may calculate or determine, for example, that an 80 MHz channel and 4 spatial streams would be more suitable than the 20 MHz channel and 2 spatial streams initially indicated to the AP 702.

In some instances, a STA can indicate an intention to transmit UL data as a plurality of duplicates carried on a corresponding plurality of communication links. Receiving devices, such as the AP 702, may use this indication to determine, obtain, or locate the communication links over which UL data is transmitted from the STAs. The ability to concurrently transmit UL data on multiple communication links may increase the likelihood that receiving devices are able to receive and successfully decode the transmitted UL data.

In various implementations, the STAs can indicate the manner in which the AP 702 solicits UL data from the respective STAs. For example, in some instances, a STA can request the AP 702 to solicit UL data using Basic Trigger frames that can solicit concurrent transmissions of UL data from multiple STAs. Specifically, STAs that are triggered or identified by a Basic Trigger frame may concurrently transmit their buffered UL data to the AP 702 as one or more UL MU PPDUs. In this way, multiple STAs can transmit UL data to the AP 702 concurrently. In other instances, the STAs can request the AP 702 to solicit UL data using MU-RTS TXS Trigger frames that can allocate a portion of a TXOP obtained by the AP 702 to one of the associated STAs. Specifically, a STA that is triggered or identified by an MU-RTS TXS Trigger frame may transmit buffered UL data to the AP 702 as one or more UL SU PPDUs. In this way, STAs that do not support UL MU PPDUs may be able to transmit buffered UL data to the AP 702 using UL SU PPDUs that are triggered by a respective MU-RTS TXS Trigger frame.

In various aspects, the request frames transmitted to the AP 702 by a STA can indicate or specify whether the AP 702 solicits UL data using Basic Trigger frames or MU-RTS TXS Trigger frames, thereby allowing the STA to determine whether to transmit UL data to the AP 702 using UL SU PPDUs or UL SU PPDUs. In some implementations, a STA may use reserved bits in the UL MU Disable subfield and the UL MU Data Disable subfield contained in the OM Control subfield of the A-Control field carried in the MAC header of the request frame to indicate the manner in which the AP 702 solicits UL data from the STA. For example, in some instances, setting a reserved bit in each of the UL MU Disable and UL MU Data Disable subfields to a configured value may indicate that the AP is to disable Basic Trigger frames and solicit UL data from associated STAs using MU-RTS TXS Trigger frames for a duration of the indicated time period. In other instances, setting the reserved bit in each of the UL MU Disable and UL MU Data Disable subfields to a configured value may indicate that the AP is to disable MU-RTS TXS Trigger frames and solicit UL data using Basic Trigger frames for the duration of the indicated time period. In this way, a STA (such as the STAs 710, 720, and 730) can use the request frame to specify whether the AP 702 uses Basic Trigger frames or MU-RTS TXS Trigger frames to solicit UL data without increasing the size of the request frame.

In some aspects, the STA may specify the type of trigger frame employed by the AP 702 based on an ability or preference to transmit UL data to the AP 702 using multi-user (MU) transmissions. For example, if a STA does not support transmitting UL MU PPDUs, the STA may specify that the AP 702 is to disable Basic Trigger frames during the time period, and use MU-RTS TXS Trigger frames to solicit UL data in the form of a single-user transmission (such as UL SU PPDUs). Conversely, if the STA supports transmitting UL MU PPDUs, the STA may specify that the AP 702 is to disable MU-RTS TXS Trigger frames during the time period, and use Basic Trigger frames to solicit UL data in the form of a multi-user transmission (such as UL MU PPDUs).

FIG. 8A shows a table 800A indicating a first set of triggered operations based on values of reserved bits in the UL MU Disable subfield and the UL MU Data Disable subfield of an Operating Mode (OM) Control subfield in the MAC header of the request frame. In some instances, setting the reserved bit in the UL MU Disable subfield to 0 while setting the reserved bit in the UL MU Data Disable subfield to 0 may cause APs to enable all trigger-based UL MU transmissions, regardless of whether the AP supports disabling the transmission of UL MU Data. When in this "00" state, APs may use trigger frames that solicit UL MU PPDUs (such as Basic Trigger frames) as well as trigger frames that solicit UL SU PPDUs (such as MU-RTS TXS Trigger frames). Setting the reserved bit in the UL MU Disable subfield to 0 while setting the reserved bit in the UL MU Data Disable subfield to 1 represents an invalid state for APs that do not support disabling UL MU Data, and may cause APs that support disabling UL MU Data to disable Basic Trigger frames. When in this "01" state, APs that support disabling the transmission of UL MU Data cannot use Basic Trigger frames to solicit UL data from their associated STAs, and instead may solicit UL SU PPDUs from their associated STAs using MU-RTS TXS Trigger frames. Setting the reserved bit in the UL MU Disable subfield to 1 while setting the reserved bit in the UL MU Data Disable subfield to 0 may cause the APs to suspend all trigger-based UL MU transmissions, regardless of whether the APs support disabling the transmission of UL MU Data. When in this "10" state, APs may only use trigger frames that solicit UL SU PPDUs from their associated STAs.

In various aspects, setting the reserved bit in the UL MU Disable subfield to 1 while setting the reserved bit in the UL MU Data Disable subfield to 1 may cause APs to disable Basic Trigger frames, regardless of whether the APs support disabling the transmission of UL MU Data. When in this "11" state, APs may use only MU-RTS TXS Trigger frames to solicit UL SU PPDUs from their associated STAs. In this way, STAs that do not support UL MU PPDUs can use the "11" state of the first configured set of triggered operations to disable Basic Trigger frames for the indicated time period.

FIG. 8B shows a table 800B indicating a second set of triggered operations based on values of reserved bits in the UL MU Disable subfield and the UL MU Data Disable subfield of the OM Control subfield in the MAC header of the request frame. As shown, the triggered operations in Table 800B corresponding to states "00," "01," and "10" are the same as the triggered operations in Table 800A corresponding to respective states "00," "01," and "10." In various aspects, setting the reserved bit in the UL MU Disable subfield to 1 while setting the reserved bit in the UL MU Data Disable subfield to 1 may cause APs to disable MU-RTS TXS Trigger frames, regardless of whether the APs support disabling the transmission of UL MU Data. When in this "11" state, APs may use only Basic Trigger frames to solicit UL MU PPDUs from their associated STAs. In this way, STAs that support UL MU PPDUs can use the "11" state of the second configured set of triggered operations to disable MU-RTS TXS Trigger frames for the indicated time period.

Figure 9:
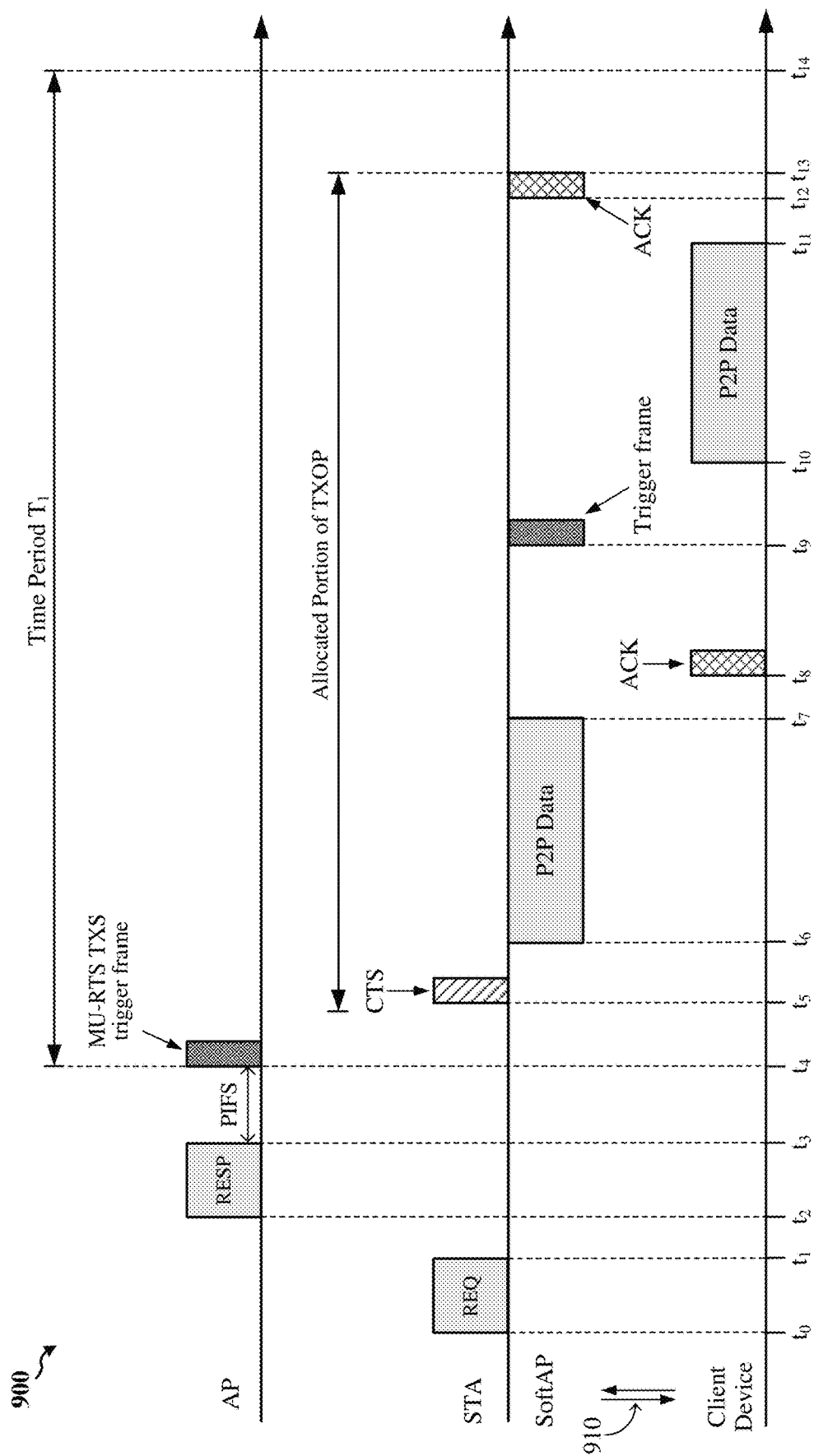
FIG. 9 shows a timing diagram depicting an example wireless communication that supports Transmission Opportunity (TXOP) sharing requests for Peer-to-Peer (P2P) communications.

FIG. 9 shows a timing diagram depicting an example wireless communication 900 that supports TXOP sharing requests for P2P communications. The timing diagram of FIG. 9 shows an AP, a STA, and a client device. In some implementations, the AP may be one example of the AP 702 of FIG. 7, the STA may be one example of the first STA 710 of FIG. 7, and the client device may be one example of the client device 712 FIG. 7. In some other implementations, the AP may be one example of the AP 102 or the AP 602 of FIGS. 1 and 6A, respectively, and the STA may be one example of the STAs 104 or the STA 604 of FIGS. 1 and 6B, respectively. Although only one STA and one client device are shown in the example of FIG. 9, in actual implementations, the BSS operated by the AP may include any suitable number of STAs, and one or more of the STAs may include or implement a softAP that can exchange low-latency P2P communications with one or more associated client devices.

As discussed with reference to FIG. 7, the STA is associated with the AP, and implements or operates a softAP with which the client device is associated via a P2P link 910. In some instances, the STA may include two MAC-SAP endpoints S1 and A1 (not shown in FIG. 9 for simplicity). The first MAC-SAP endpoint S1 may be responsible for decoding frames and packets received over the wireless medium from the AP, and may be responsible for constructing and formatting frames for transmission over the wireless medium from the STA to the AP. The second MAC-SAP endpoint A1 may be responsible for decoding frames and packets received over the P2P link 910 from the client device, and may be responsible for constructing and formatting frames for transmission from the softAP to the client device over the P2P link 910. In some instances, the MAC-SAP endpoints of the STA may have different MAC addresses.

In some implementations, the STA may be associated with a low-latency application having strict end-to-end latency, throughput, and timing requirements for data traffic. Example low-latency applications include, but are not limited to, real-time gaming applications, video communications, and augmented reality (AR) and virtual reality (VR) applications (collectively referred to as extended reality (XR) applications). In some instances, the STA may utilize P2P communications to exchange latency-sensitive traffic with the client device. For example, in some aspects, the STA may be executing a real-time gaming application that transmits and receives gaming data to and from a gaming service via an associated AP while also operating as a softAP that transmits and receives gaming data to and from an associated AR/VR headset via a P2P link. The P2P communications between the STA (or softAP) and the AR/VR headset may be subject to the latency, throughput, and timing requirements associated with the real-time gaming application. Similarly, gaming data transmitted between the STA and the AP also may be subject to the latency, throughput, and timing requirements associated with the real-time gaming application.

As discussed, although latency-sensitive traffic may be afforded enhanced channel protection using r-TWT SPs, real-time gaming traffic (and other types of latency-sensitive traffic) may benefit from an ability of a STA to dynamically request additional wireless resources (or fewer wireless resources) based on changes in traffic flows exchanged with the STA, changes in channel conditions, or changes in the latency requirements associated with the real-time gaming application. In the example of FIG. 9, the STA may determine or obtain information indicating changes in DL traffic, UL traffic, latency requirements, throughout, or network congestion that can impair the STA's ability to meet latency and throughout requirements associated with the gaming application. In various aspects, the STA may adjust the amount or quantity of DL resources allocated to the real-time gaming traffic relative to the amount or quantity of UL resources allocated to the real-time gaming traffic. For example, if increases in the DL traffic associated with the real-time gaming application increases the asymmetry between UL and DL traffic, the STA can request a larger bandwidth or additional spatial streams, or both, for DL transmissions to the STA. In some aspects, the STA also may request a smaller bandwidth or fewer spatial streams, or both, for DL transmissions to the STA. In this way, the STA may use spatial streams previously allocated for DL transmissions of real-time gaming traffic to receive DL data associated with other applications.

At time $t_0$, the STA transmits a request frame (REQ) over the wireless medium to the AP. The request frame may indicate timing parameters, transmission parameters, operation parameters, and other suitable parameters to be used for UL and DL transmissions during a time period $T_1$. The timing parameters may include (but are not limited to) a duration of the time period, a start of the time period, service intervals, wake intervals, wake durations, and other suitable timing parameters. The transmission parameters may include (but are not limited to) a minimum bandwidth, a maximum bandwidth, a minimum data rate, a maximum data rate, a minimum MSDU size, a maximum MSDU size, a delay bound, a burst size, and other suitable transmission parameters. The operation parameters may include (but are not limited to) channel information, group information, a flow type, traffic stream information, and other parameters applicable to the wireless communication devices during the time period $T_1$.

In various implementations, the request frame also may indicate one or more of the requested bandwidth for DL transmissions, the requested bandwidth for UL transmissions, the requested quantity of spatial streams for DL transmissions, or the requested quantity of spatial streams for UL transmissions. In some instances, the requested bandwidth for DL transmissions may be different than the requested bandwidth for UL transmissions. Similarly, the quantity of spatial streams for DL transmissions may be different than the quantity of spatial streams for UL transmissions. In other instances, the requested bandwidths for UL and DL transmissions may be the same as or similar to one another, and the quantities of spatial streams for UL and DL transmissions may be the same as or similar to one another.

In some aspects, the request frame also may indicate the periodicity of the requested bandwidths or quantities of spatial streams. In other instances, the request frame also may indicate an intention of the STA to transmit UL data using duplicates carried on a plurality of communication links, for example, to increase the likelihood that data transmitted from the STA is received and successfully decoded by one or more receiving devices. The request frame also may indicate the communication links over which the duplicates are to be transmitted.

In some implementations, the request frame may be a TWT request frame including a request for the AP to schedule a TWT service period (SP) for data transmissions to, and data transmissions from, the STA. In some instances, the TWT request frame may request the AP to establish one or more TWT SPs for P2P communications between the STA and its client device. In other instances, the TWT request frame may request the AP to schedule one or more restricted TWT (r-TWT) SPs for latency-sensitive traffic associated with the STA (thereby providing enhanced channel protection for the latency-sensitive traffic). In some aspects, the TWT request frame may include a TWT Element or an Information Element (IE) that indicates one or more of the requested bandwidths for UL and DL transmissions, the requested quantities of spatial streams for UL and DL transmissions, the periodicity of the requests, or the STA's intention to transmit UL data as duplicates on a plurality of different communication links. In various aspects, the TWT Element or IE also may indicate whether the AP is to (1) disable MU-RTS TXS Trigger frames and solicit UL data using Basic Trigger frames or (2) disable Basic Trigger frames and solicit UL data using MU-RTS TXS Trigger frames.

In some other implementations, the request frame may be an SCS request frame including a request for the AP to create an SCS stream for a traffic flow associated with a Quality-of-Service (QoS) period. In some instances, the SCS request frame may include a TSPEC Element, a QoS Characteristics Element, or a new IE that indicates one or more of the requested bandwidths for UL and DL transmissions, the requested quantities of spatial streams for UL and DL transmissions, the periodicity of the requests, or the STA's intention to transmit UL data as duplicates on a plurality of different communication links.

The request frame, which may be a TWT request frame, an SCS request frame, or a new type of request frame, also may indicate the manner in which the AP solicits UL data from the STA. For example, in various aspects, the request frame may indicate whether the AP is to solicit UL data from the STA using Basic Trigger frames or using MU-RTS TXS Trigger frames. As discussed, a Basic Trigger frame may solicit UL data from a plurality of STAs, which can respond by concurrently transmitting their buffered UL data to the AP via multi-user (MU) transmission techniques (such as in one or more UL MU PPDUs). An MU-RTS TXS Trigger frame may solicit UL data from a STA, which can respond by transmitting its buffered UL data to the AP using single-user (SU) transmission techniques (such as in one or more UL SU PPDUs). The MU-RTS TXS Trigger frame also may allocate a portion of the AP's TXOP to the STA, thereby allowing the STA to transmit its UL data without contending for channel access. In some instances, reserved bits in the UL MU Disable and UL MU Data Disable subfields of the OM Control subfield contained in the A-Control field carried in the MAC header of the request frame may be used to indicate the type of trigger frame to be used by the AP during the time period $T_1$, for example, as described with reference to FIGS. 8A-8B. In some aspects, the reserved bits in the UL MU Disable and UL MU Data Disable subfields of the OM Control subfield also may be used to disable Basic Trigger frames or MU-RTS TXS Trigger frames during the time period $T_1$.

In the example of FIG. 9, the STA configures the reserved bits in the UL MU Disable and UL MU Data Disable subfields of the OM Control subfield to indicate that the AP is to solicit UL data using Basic Trigger frames during the time period $T_1$. In some aspects, configuration of the reserved bits of the UL MU Disable and UL MU Data Disable subfields also may cause the AP to disable MU-RTS TXS Trigger frames during the time period $T_1$. In this way, the STA may ensure that UL data buffered in STAs associated with the AP is transmitted to the AP, concurrently, using multi-user (MU) transmission techniques.

The AP receives the request frame between times to and $t_1$, and acknowledges reception of the request frame by transmitting a response frame (RESP) to the STA at time $t_2$. In some implementations, the AP may determine whether to accept or decline the requests, and also may determine whether to accept, decline, or modify one or more of the parameters indicated in the request frame. In some aspects, the response frame may confirm or modify each of the parameters indicated in the request frame. For example, in instances for which the request frame is a TWT request frame that includes a request for the AP to schedule one or more TWT SPs for P2P communications or latency-sensitive traffic, the response frame may be a TWT response frame that confirms or modifies the TWT parameters indicated in the TWT request frame (in addition to the DL/UL bandwidths, quantities of spatial streams, or intention to use duplicates to carry UL data during the time period). For another example, in instances for which the request frame is an SCS request frame that includes a request for the AP to create an SCS stream for a class of traffic associated with a QoS period, the response frame may be an SCS response frame that confirms or modifies the SCS parameters and attributes (in addition to the DL/UL bandwidths, quantities (or numbers) of spatial streams, or intention to use duplicates to carry UL data during the time period).

The STA receives the response frame transmitted by the AP between times $t_2$ and $t_3$, and may remain in the awake state to listen for trigger frame transmissions from the AP. Between times $t_3$ and $t_4$, the AP senses that the wireless medium is idle for a duration based on a channel sensing operation (such as clear channel assessment (CCA)) before attempting to obtain a TXOP on the wireless medium. In some instances, the AP may sense that the wireless medium is idle for a PIFS duration before attempting to gain channel access (such that the period of time between times $t_3$ and $t_4$ is a PIFS duration). At time $t_4$, the AP senses that the wireless medium is still idle and proceeds to obtain a TXOP, for example, by initiating a transmission over the wireless medium. Specifically, the AP transmits an MU-RTS TXS Trigger frame over the wireless medium to the STA at time $t_4$. The MU-RTS TXS Trigger frame allocates a portion of the TXOP to the STA for P2P communications associated with the client device. Specifically, the MU-RTS TXS Trigger frame may include a TXOP sharing mode subfield indicating a TXOP sharing mode for the P2P communications between the STA and the client device. In some instances, the MU-RTS TXS Trigger frame may include the MAC address or AID of the STA, and also may include the MAC address of the client device, so that the client device does not set its NAV to the period of time indicated in the duration field of the MU-RTS TXS Trigger frame, and instead remains awake to receive transmissions from the STA. In some other implementations, other types of trigger frames that solicit UL SU PPDUs from the STA can be used.

The STA receives the MU-RTS TXS Trigger frame between times $t_4$ and $t_5$, and determines the allocated portion of the TXOP. At time $t_5$, the STA acknowledges reception of the MU-RTS TXS Trigger frame by transmitting a CTS frame to the AP. In some instances, the CTS frame identifies the softAP and the client device, for example, to prevent the softAP and the client device from setting their respective NAVs to the period of time indicated in the duration field of the CTS frame.

At time $t_6$, the softAP (or STA) transmits P2P data to the client device over the P2P link 910. In some instances, the P2P link 910 may be established using a Wi-Fi Tunneled Direct Link Setup (TDLS). In other instances, the P2P link 910 may be a W-Fi Direct connection. In some other instances, the STA or the softAP may be a group owner (GO) and coordinate P2P transmissions to or from the client device. The client device receives the P2P data between times $t_6$ and $t_7$, and acknowledges its reception by transmitting an ACK frame to the softAP (or STA) at time $t_8$.

At time $t_9$, the softAP (or STA) transmits a trigger frame over the P2P link 910 to the client device. The trigger frame, which may be a basic trigger frame, solicits queued P2P data from the client device. The client device receives the trigger frame and, in response thereto, transmits P2P data to the softAP (or STA) using the P2P link 910 at time $t_{10}$. The softAP (or STA) receives the P2P data between times $t_{10}$ and $t_{11}$, and acknowledges its reception by transmitting an ACK frame to the client device at time $t_{12}$. At time $t_{13}$, the allocated portion of the TXOP obtained by the AP ends. At time $t_{14}$, the time period $T_1$ indicated in the request frame expires, and the AP may reclaim the remainder of the TXOP (if any).

Figure 10:
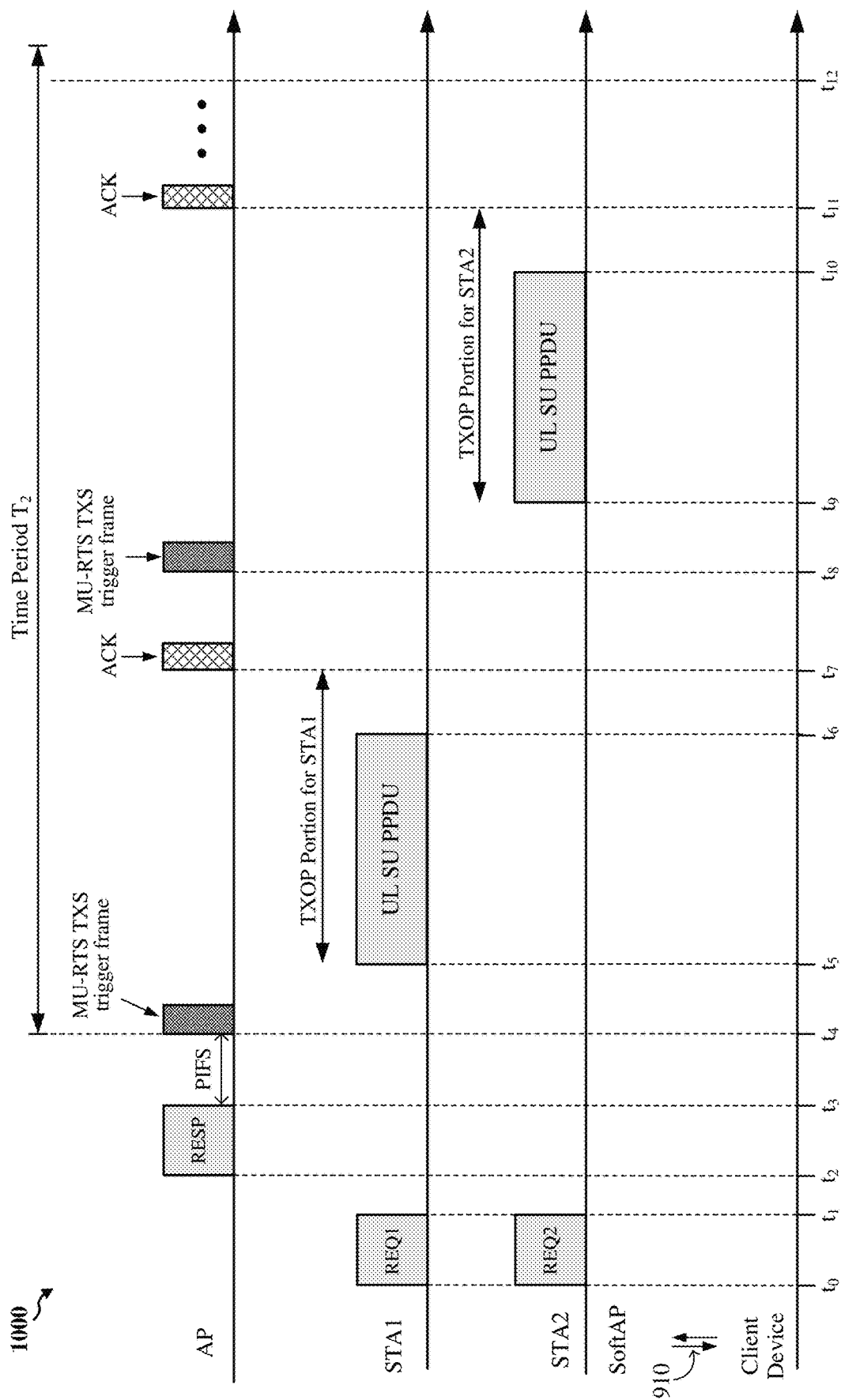
FIG. 10 shows a timing diagram depicting an example wireless communication that supports TXOP sharing requests for single-user (SU) uplink (UL) transmissions.

FIG. 10 shows a timing diagram depicting an example wireless communication 1000 that supports TXOP sharing requests for UL SU transmissions. The timing diagram of FIG. 10 is shown to include an AP, a first wireless station (STA1), a second wireless station (STA2), and a client device. In some implementations, the AP may be one example of the AP 702 of FIG. 7, STA1 may be one example of the second STA 720 or third STA 730 of FIG. 7, STA2 may be one example of the first STA 710 of FIG. 7, and the client device may be one example of the client device 712 of FIG. 7. In some other implementations, the AP may be one example of the APs 102 or 602 of FIGS. 1 and 6A, respectively, and STA1-STA2 may be examples of the STAs 104 or 604 of FIGS. 1 and 6B, respectively. Although only two STAs and one client device are shown in the example of FIG. 10, in actual implementations, the BSS operated by the AP may include any suitable number of STAs.

At time $t_0$, STA1 transmits a first request frame (REQ1) over the wireless medium to the AP, and STA2 transmits a second request frame (REQ2) over the wireless medium to the AP. In some instances, the first and second request frames depicted in FIG. 10 may be examples of the request frame described with reference to FIG. 9. That is, each of the first and second request frames may indicate an UL transmission bandwidth to be used during a time period $T_2$, a DL transmission bandwidth to be used during the time period $T_2$, a quantity of spatial streams for UL transmissions during the time period $T_2$, a quantity of spatial streams for DL transmissions during the time period $T_2$, periodicity information, and whether the respective STA intends to transmit UL data as a plurality of duplicates over a corresponding plurality of communication links during the time period $T_2$. The request frames also may include various timing parameters, transmission parameters, operation parameters, and other suitable parameters to be used for UL and DL transmissions during the time period $T_2$.

As discussed, in some instances, the request frames can be TWT request frames that include a request for the AP to schedule a TWT SP for P2P communications associated with the respective STA, or to schedule a r-TWT SP for latency-sensitive traffic associated with the respective STA. In other instances, the request frames can be SCS request frames that include a request for the AP to create an SCS stream for a traffic flow associated with a QoS period. In some other instances, the request frames can be a new type of request frame.

As described with reference to FIG. 9, the first and second request frames also may indicate the manner in which the AP is to solicit UL data from the first and second wireless stations STA1 and STA2, respectively. In the example of FIG. 10, each of STA1 and STA2 requests the AP to solicit UL data using MU-RTS TXS Trigger frames during the time period $T_2$. STAs that are responsive to an MU-RTS TXS Trigger frame transmit UL data to the AP using MU communications. The use of MU-RTS TXS Trigger frames, rather than Basic Trigger frames, may allow STAs that do not support MU operation to participate in TXOP sharing periods on the wireless medium.

The AP receives the first and second request frames between times to and $t_1$, and acknowledges reception of the request frames by transmitting response frames (RESP) to STA1 and STA2 at time $t_2$. As discussed, the response frame may include a MAC header that carries the acknowledgement of the first and second request frames. STA1 and STA2 receive the response frame between times $t_2$ and $t_3$, and may remain in the awake state to listen for trigger frame transmissions from the AP.

The AP senses that the wireless medium is idle for a PIFS duration, from times $t_3$ to $t_4$, based on a channel sensing operation before attempting to obtain a TXOP on the wireless medium. At time $t_4$, the AP senses that the wireless medium is still idle and proceeds to obtain a TXOP by initiating a transmission over the wireless medium. Specifically, the AP transmits a first MU-RTS TXS Trigger frame over the wireless medium at time $t_4$. In the example of FIG. 10, the first MU-RTS TXS Trigger frame allocates a first portion of the TXOP obtained by the AP to STA1. In some aspects, the first MU-RTS TXS Trigger frame may include a TXOP sharing mode subfield indicating a TXOP sharing mode for transmitting buffered UL data to the AP.

STA1 and STA2 receive the first MU-RTS TXS Trigger frame, and decode at least part of the first MU-RTS TXS Trigger frame. STA1 and STA2 determine that the first MU-RTS TXS Trigger frame solicits UL data from STA1, and that the first MU-RTS TXS Trigger frame allocates a first portion of the TXOP to STA1 for UL transmissions. At time $t_5$, STA1 transmits some or all of its buffered UL data to the AP in one or more UL SU PPDUs. The AP receives the one or more UL SU PPDUs between times $t_5$ and $t_6$, and acknowledges their reception by transmitting an ACK frame to STA1 at time $t_7$. The first TXOP portion, allocated to STA1 for UL transmissions to the AP, ends between times $t_7$ and $t_8$.

At time $t_8$, the AP transmits a second MU-RTS TXS Trigger frame over the wireless medium. In the example of FIG. 10, the second MU-RTS TXS Trigger frame allocates a second portion of the TXOP obtained by the AP to STA2. In some aspects, the second MU-RTS TXS Trigger frame may include a TXOP sharing mode subfield indicating a TXOP sharing mode for transmitting buffered UL data to the AP.

STA1 and STA2 receive the second MU-RTS TXS Trigger frame, and decode at least part of the second MU-RTS TXS Trigger frame. STA1 and STA2 determine that the second MU-RTS TXS Trigger frame solicits UL data from STA2, and that the second MU-RTS TXS Trigger frame allocates the second portion of the TXOP to STA2 for UL transmissions. At time $t_9$, STA2 transmits some or all of its buffered UL data to the AP in one or more UL SU PPDUs. The AP receives the one or more UL SU PPDUs between times $t_9$ and $t_{10}$, and acknowledges their reception by transmitting an ACK frame to STA2 at time $t_{11}$. The second TXOP portion, allocated to STA2 for UL transmissions to the AP, ends between times $t_{11}$ and $t_{12}$. At time $t_{13}$, the time period $T_2$ indicated in the first and second request frames expires, and the AP may reclaim the remainder of the TXOP (if any).

Figure 11:
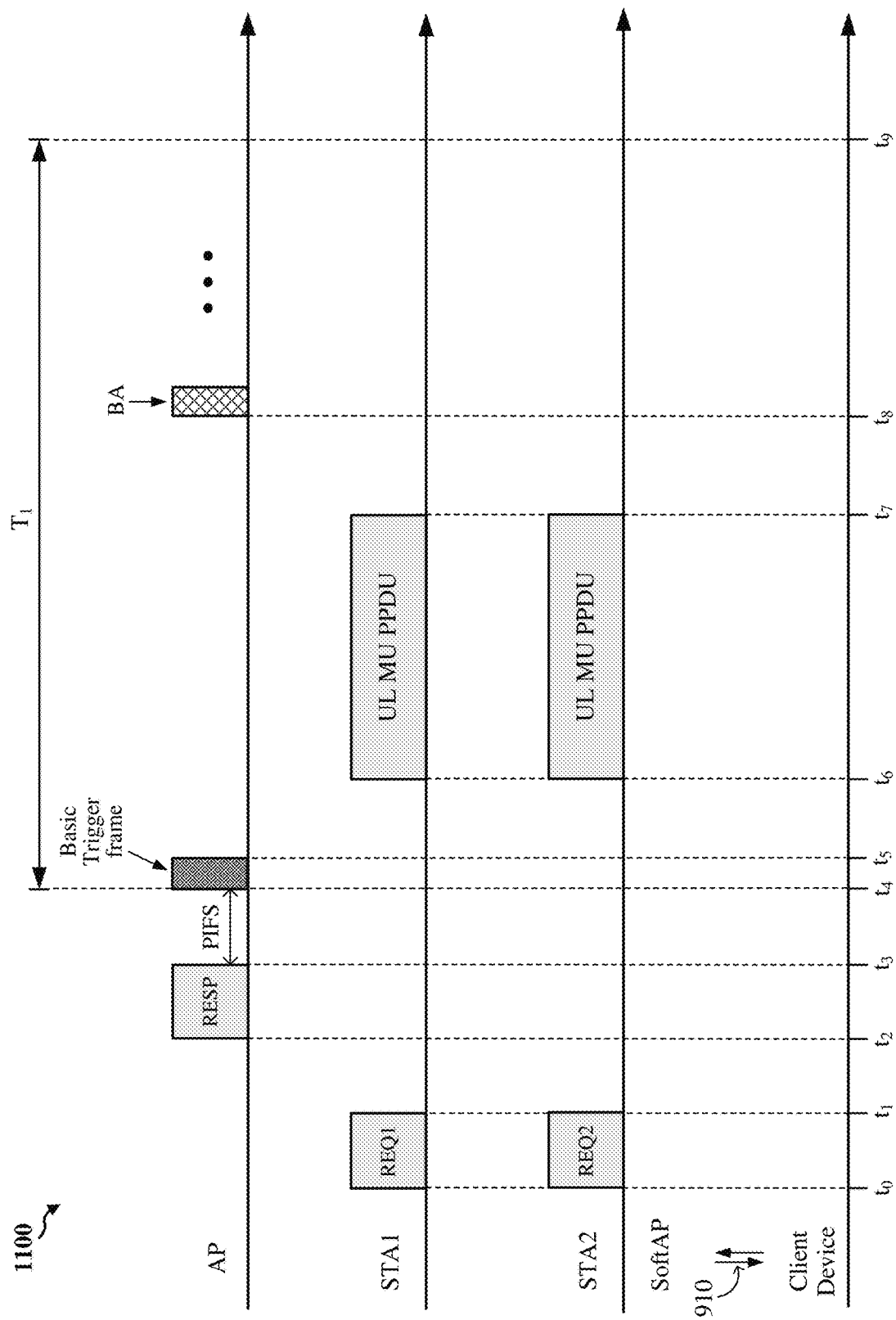
FIG. 11 shows a timing diagram depicting an example wireless communication that supports TXOP sharing requests for multi-user (MU) UL transmissions.

FIG. 11 shows a timing diagram depicting an example wireless communication 1100 that supports TXOP sharing requests for UL SU transmissions. The timing diagram of FIG. 11 is shown to include the AP, STA1, STA2, and the client device described with reference to FIG. 10. In some implementations, the AP may be one example of the AP 702 of FIG. 7, STA1 may be one example of the first STA 710 of FIG. 7, STA2 may be one example of the second STA 720 of FIG. 7, and the client device may be one example of the client device 712 FIG. 7. In some other implementations, the AP may be one example of the APs 102 or 602 of FIGS. 1 and 6A, respectively, and STA1-STA2 may be examples of the STAs 104 or 604 of FIGS. 1 and 6B, respectively. Although only two STAs and one client device are shown in the example of FIG. 11, in actual implementations, the BSS operated by the AP may include any suitable number of STAs.

At time to, STA1 transmits a first request frame (REQ1) to the AP, and STA2 transmits a second request frame (REQ2) to the AP. The first and second request frames depicted in FIG. 11 may be examples of the first and second request frames described with reference to FIG. 11, or may be examples of the request frame described with reference to FIG. 9. As discussed, each of the first and second request frames may indicate an UL transmission bandwidth to be used during a time period $T_3$, a DL transmission bandwidth to be used during the time period $T_3$, a quantity of spatial streams for UL transmissions during the time period $T_3$, a quantity of spatial streams for DL transmissions during the time period $T_3$, periodicity information, and whether the respective STA intends to transmit UL data as a plurality of duplicates over a corresponding plurality of communication links during the time period $T_3$. The request frames also may include various timing parameters, transmission parameters, operation parameters, and other suitable parameters to be used for UL and DL transmissions during the time period $T_3$.

The first and second request frames can be any suitable request frames or action frames. In various aspects, the first and second request frames may be TWT request frames, SCS request frame, or a new type of request frame. As discussed, TWT request frames can request the AP to schedule one or more TWT SPs for P2P communications, or to schedule one or more r-TWT SPs for latency-sensitive traffic. SCS request frames can request the AP to create an SCS stream for a traffic flow associated with a QoS period.

As described with reference to FIG. 11, the first and second request frames also may indicate the manner in which the AP is to solicit UL data from STA1 and STA2, respectively. In the example of FIG. 11, each of STA1 and STA2 requests the AP to solicit UL data using Basic Trigger frames during a time period $T_3$. The AP receives the first and second request frames between times to and $t_1$, and acknowledges reception of the request frames by transmitting response frames (RESP) to STA1 and STA2 at time $t_2$. As discussed, the response frame may include a MAC header that carries the acknowledgement of the first and second request frames. STA1 and STA2 receive the response frame between times $t_2$ and $t_3$, and may remain in the awake state to listen for trigger frame transmissions from the AP.

The AP senses that the wireless medium is idle for a PIFS duration, from times $t_3$ to $t_4$, based on a channel sensing operation before attempting to obtain a TXOP on the wireless medium. At time $t_4$, the AP senses that the wireless medium is still idle and proceeds to obtain a TXOP by initiating a transmission over the wireless medium. Specifically, the AP transmits a Basic Trigger frame over the wireless medium at time $t_4$. In the example of FIG. 11, the Basic Trigger frame solicits UL data from both STA1 and STA2, for example, by carrying the AID values of STA1 and STA2 in Per User Info fields of the Basic Trigger frame.

Each of STA1 and STA2 receives the Basic Trigger frame between times $t_4$ and $t_5$, and determines that its AID value is carried in the Basic Trigger frame. That is, the Basic Trigger frame solicits UL data from both of STA1 and STA2, concurrently, using MU operations. At time $t_5$, STA1 and STA2 transmit some or all of their buffered UL data to the AP, concurrently, using one or more UL MU PPDUs. The AP receives the one or more UL MU PPDUs between times $t_6$ and $t_7$, and acknowledges their reception by transmitting a block acknowledgement (BA) to STA1 and STA2 at time $t_8$. The time period $T_3$ is shown to end at time $t_9$.

Figure 12:
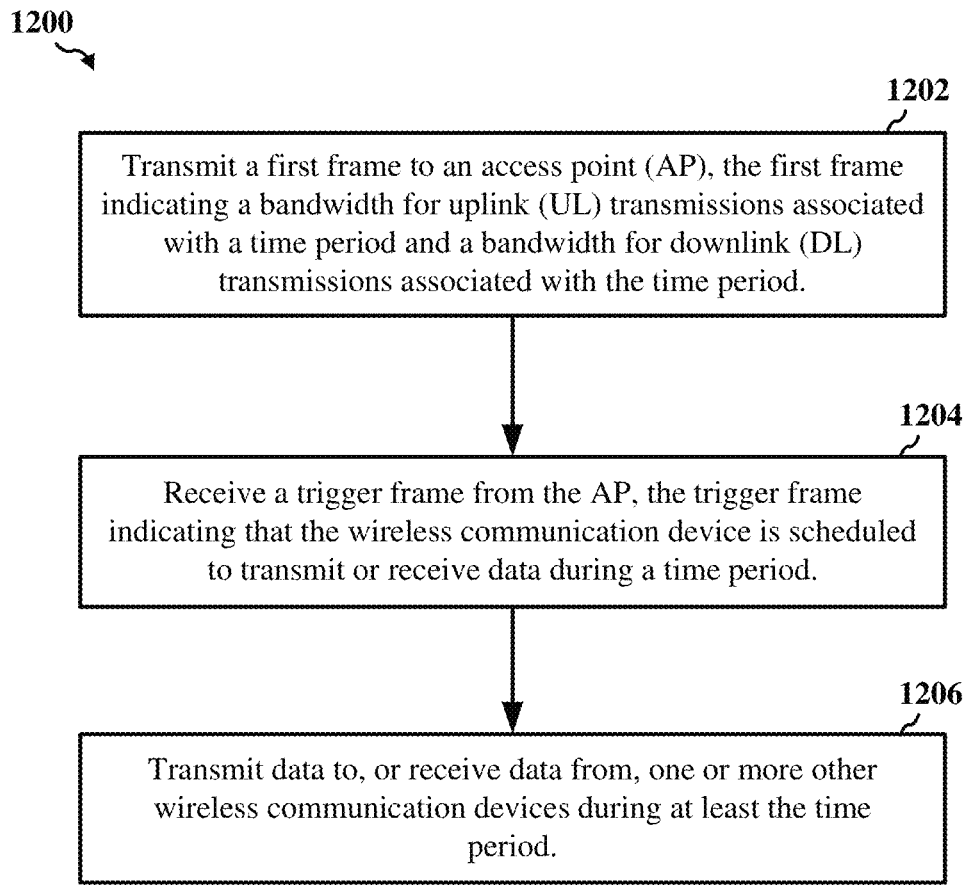
FIG. 12 shows a flowchart illustrating an example operation for wireless communication that supports TXOP sharing requests.

FIG. 12 shows a flowchart illustrating an example operation 1200 for wireless communication that supports TXOP sharing requests. The operation 1200 may be performed by a wireless communication device such as the wireless communication device 500 described above with reference to FIG. 5. In some instances, the operation 1200 may be performed by a wireless communication device operating as or within a STA, such as one of the STAs 102 and 604 described above with reference to FIGS. 1 and 6B, respectively.

For example, at 1202, the wireless communication device transmits a first frame to an access point (AP), the first frame indicating a bandwidth for uplink (UL) transmissions associated with a time period and a bandwidth for downlink (DL) transmissions associated with the time period. At 1204, the wireless communication device receives a trigger frame from the AP, the trigger frame indicating that the wireless communication device is scheduled to transmit or receive data during a time period. At 1206, the wireless communication device transmits or receives data to or from one or more other wireless communication devices during at least the time period. In some instances, the bandwidth indicated for UL transmissions may be different than the bandwidth indicated for DL transmissions. In other instances, the bandwidth indicated for UL transmissions may be the same as or similar to the bandwidth indicated for UL transmissions.

In some implementations, the first frame may be a Target Wake Time (TWT) request frame including a request for the AP to schedule a TWT service period (SP) for latency-sensitive traffic or peer-to-peer (P2P) communications associated with the wireless communication device. The TWT request frame may include a TWT Element or a new Information Element (IE) indicating the respective quantities of spatial streams to be used for UL and DL transmissions during the TWT SP. The quantity of spatial streams used for UL transmissions may be the same as, or different than, the quantity of spatial streams used for DL transmissions. The requested bandwidths for UL and DL transmissions, and their corresponding periodicity information, also may be included in the TWT Element. In various aspects, the TWT Element or the new IE also may indicate whether the STA intends to transmit UL data as a plurality of duplicates carried on a corresponding plurality of communication links. In some other instances, the TWT request frame can be used to disable either UL SU transmissions or UL MU transmissions.

In some other implementations, the first frame may be a Stream Classification Service (SCS) request frame including a request for the AP to create an SCS stream for a class of traffic associated with a Quality-of-Service (QoS) period. The SCS request frame may include one of a Traffic Specification (TSPEC) Element, a QoS Characteristics Element, or a new IE that indicates the respective quantities of spatial streams to be used for UL and DL transmissions during the QoS period. The requested bandwidths for UL and DL transmissions, and their corresponding periodicity information, also may be included in the TSPEC Element, the QoS Characteristics Element, or the new IE. In various aspects, the TSPEC Element, the QoS Characteristics Element, or the new IE also may indicate whether the STA intends to transmit UL data as a plurality of duplicates carried on a corresponding plurality of communication links. In some other instances, the SCS request frame can be used to disable either UL SU transmissions or UL MU transmissions.

In some implementations, the trigger frame may be an MU-RTS TXS Trigger frame that allocates a portion of a TXOP obtained by the AP to the wireless communication device. In various aspects, the MU-RTS TXS Trigger frame solicits one or more UL SU PPDUs from one STA at any given instance. In some other implementations, the trigger frame may be a Basic Trigger frame that can solicit UL MU PPDUs from a plurality of associated STAs, concurrently.

Figure 13:
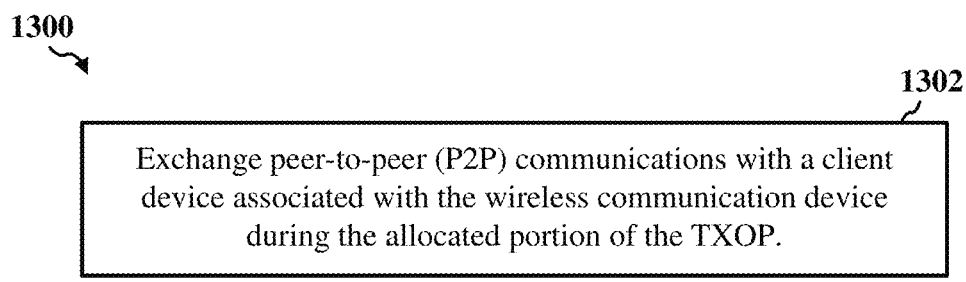
FIG. 13 shows a flowchart illustrating another example operation for wireless communication that supports TXOP sharing requests.

FIG. 13 shows a flowchart illustrating an example operation 1300 for wireless communication that supports TXOP sharing requests. The operation 1300 may be performed by a wireless communication device such as the wireless communication device 500 described above with reference to FIG. 5. In some implementations, the operation 1300 may be performed by a wireless communication device operating as or within a STA, such as one of the STAs 104 and 604 described above with reference to FIGS. 1 and 6B, respectively.

In some instances, the operation 1300 may be one implementation of transmitting or receiving the data in 1206 of FIG. 12. For example, at 1302, the wireless communication device exchanges peer-to-peer (P2P) communications with a client device associated with the wireless communication device during the allocated portion of the TXOP.

Figure 14:
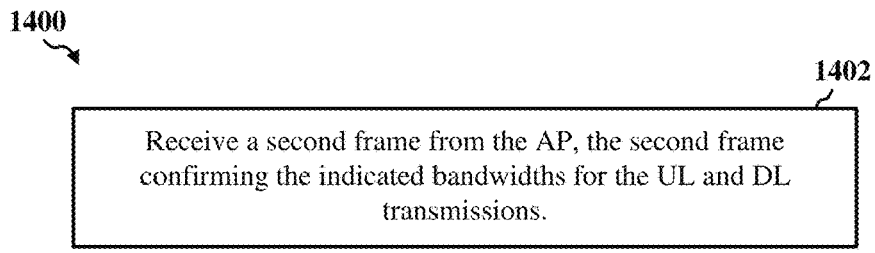
FIG. 14 shows a flowchart illustrating another example operation for wireless communication that supports TXOP sharing requests.

FIG. 14 shows a flowchart illustrating an example operation 1400 for wireless communication that supports TXOP sharing requests. The operation 1400 may be performed by a wireless communication device such as the wireless communication device 500 described above with reference to FIG. 5. In some implementations, the operation 1400 may be performed by a wireless communication device operating as or within a STA, such as one of the STAs 104 and 604 described above with reference to FIGS. 1 and 6B, respectively.

In some implementations, the operation 1400 may be performed after transmitting the first frame to the AP in 1202 of FIG. 12. For example, at 1402, the wireless communication device receives a second frame from the AP, the second frame confirming the indicated bandwidths for the UL and DL transmissions. In some instances, the second frame may be a TWT response frame. In other instances, the second frame may be an SCS response frame.

Figure 15:
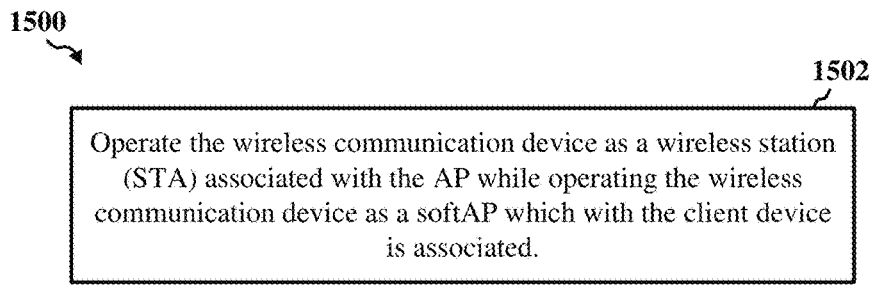
FIG. 15 shows a flowchart illustrating another example operation for wireless communication that supports TXOP sharing requests.

FIG. 15 shows a flowchart illustrating an example operation 1500 for wireless communication that supports TXOP sharing requests. The operation 1500 may be performed by a wireless communication device such as the wireless communication device 500 described above with reference to FIG. 5. In some implementations, the operation 1500 may be performed by a wireless communication device operating as or within a STA, such as one of the STAs 104 and 604 described above with reference to FIGS. 1 and 6B, respectively.

In some implementations, the operation 1500 may be performed in conjunction with the operation 1200 of FIG. 12. For example, at 1502, the wireless communication device operates as a wireless station (STA) associated with the AP while also operating as a softAP with which the client device is associated.

Figure 16:
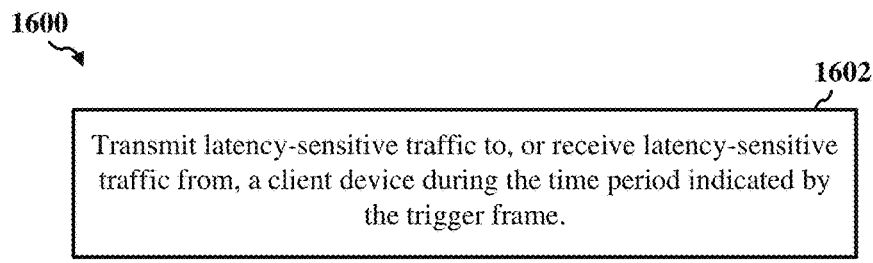
FIG. 16 shows a flowchart illustrating another example operation for wireless communication that supports TXOP sharing requests.

FIG. 16 shows a flowchart illustrating an example operation 1600 for wireless communication that supports TXOP sharing requests. The operation 1600 may be performed by a wireless communication device such as the wireless communication device 500 described above with reference to FIG. 5. In some implementations, the operation 1600 may be performed by a wireless communication device operating as or within a STA, such as one of the STAs 104 and 604 described above with reference to FIGS. 1 and 6B, respectively.

In some implementations, the operation 1600 may be one implementation of transmitting or receiving the data in 1206 of FIG. 12. For example, at 1602, the wireless communication device transmits latency-sensitive traffic to or receives latency-sensitive traffic from a client device during the time period indicated by the trigger frame.

Figure 17:
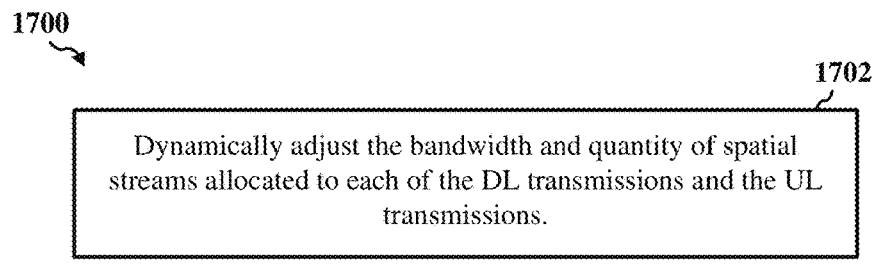
FIG. 17 shows a flowchart illustrating another example operation for wireless communication that supports TXOP sharing requests.

FIG. 17 shows a flowchart illustrating an example operation 1700 for wireless communication that supports TXOP sharing requests. The operation 1700 may be performed by a wireless communication device such as the wireless communication device 500 described above with reference to FIG. 5. In some implementations, the operation 1700 may be performed by a wireless communication device operating as or within a STA, such as one of the STAs 104 and 604 described above with reference to FIGS. 1 and 6B, respectively.

In some implementations, the operation 1700 may be performed in conjunction with the operation 1200 of FIG. 12. For example, at 1702, the wireless communication device may dynamically adjust the bandwidth and quantity of spatial streams allocated to each of the DL transmissions and the UL transmissions.

FIG. 18 shows an example structure of a MAC header 1800 usable for wireless communications that support TXOP sharing requests. The MAC header 1800 may include a Frame Control field 1801, a Duration/ID field 1802, an Address 1 field 1803, an Address 2 field 1804, an Address 3 field 1805, a Sequence Control field 1806, an Address 4 field 1807, a QoS Control field 1808, an HT Control field 1809, a Frame body 1810, and an FCS field 1811. In some other implementations, the MAC header 1800 may include other fields, fewer fields, or more fields.

The Frame Control field 1801 may indicate the form or function of a corresponding frame that includes the MAC header 1800. For example, the Frame Control field 1801 may identify the corresponding frame that includes the MAC header 1800 as a particular type of frame (such as a beacon frame or a P2P Request frame). The Duration/ID field 1802 may indicate the duration of the corresponding frame in milliseconds. The Address 1 field 1803 may indicate a destination address of the corresponding frame. In some instances, the Address 1 field 1803 may contain a broadcast or multicast address, for example, when the corresponding frame is intended for a plurality of wireless communication devices.

The Address 2 field 1804 may indicate a source address of the corresponding frame. For example, the Address 2 field 1804 may include a MAC address of the wireless device that transmitted the corresponding frame. The Address 3 field 1805 may include a BSSID. In some aspects, the BSSID may be the MAC address of the wireless device that transmitted the corresponding frame. The Sequence Control field 1806 includes a sequence number and a fragment number. The sequence number identifies a corresponding MAC frame (such as an MSDU or A-MSDU), and the fragment number indicates the number of each fragment of an MSDU. The Address 4 field 1807 is optional, and may indicate a forwarding address when the corresponding frame is transmitted over a mesh network.

The QoS Control field 1808 may include five or eight subfields (depending on the frame type and the capabilities of the transmitting device), and may carry a value indicating the traffic class or traffic stream to which the corresponding frame belongs. The QoS Control field 1808 also may indicate other QoS information about the corresponding frame including (but not limited to) a buffer size, a queue size, the duration of the requested part of the TXOP, a TXOP limit, and so on.

The HT Control field 1809 may have three variants including the HT variant, the VHT variant, and the HE variant. For example, while the HT and VHT variants include a Control Middle subfields, an AC Constraint subfield, and a More PPDU subfield, the HE variant includes an A-Control subfield. The Frame body 1810 carries data implemented as one or more MSDUs or MDPUs. The FCS field 1811 may include error-detecting codes that enable error detection of data in the corresponding frame.

FIG. 19 shows an example structure of an A-Control subfield 1900 usable for wireless communications that support TXOP sharing requests. The A-Control subfield 1900 includes a Control List field 1901 and padding 1902. The padding 1902, if present, follows the last Control subfield and is set to a sequence of zeros so that the length of the A-Control subfield 1900 is 30 bits. The Control List field 1901 includes a Control ID subfield 1911 and a Control Information subfield 1912. The Control ID subfield 1911 indicates the type of information carried in the Control Information subfield 1912. The length of the Control Information subfield 1912 is fixed for each value of the Control ID subfield 1911 that is not reserved.

The Control Information subfield 1912 may include one or more Operating Mode (OM) Control subfields 1920. The OM control subfield 1920 may include a Receive Number of Spatial Streams (Rx NSS) subfield 1921, a Channel Width subfield 1922, an UL MU Disable subfield 1923, a Transmit Number of Spatial Streams (Tx NSS) subfield 1924, an Extended Range (ER) Single-User (SU) Disable subfield 1925, a DL MU-MIMO Resound Recommendation subfield 1926, and an UL MU Data Disable subfield 1927. The Rx NSS subfield 1921 indicates the quantity of spatial streams for receiving data. The Channel Width subfield 1922 indicates the bandwidth requested. The UL MU Disable subfield 1923 indicates whether UL MU is disabled. The Tx NSS subfield 1924 indicates the quantity of spatial streams for transmitting data. The ER SU Disable subfield 1925 indicates whether extended range is disabled. The UL MU Data Disable subfield 1927 indicates whether transmissions of UL MU data are disabled.

FIG. 20 shows an example structure of a Stream Classification Service (SCS) Request frame 2000 usable for wireless communications that support TXOP sharing requests. In some aspects, the SCS Request frame 2000 may be used to request the creation, modification, or deletion of a stream classification. The SCS Request frame 2000 includes a Category field 2001, a Robust Action field 2002, a Dialog Token field 2003, and an SCS Descriptor List field 2004. The Category field 2001 is set to one of the non-reserved values provided in the Code column of Table 9-51 of the IEEE 802.11 family of wireless communication standards. The Robust Action field 2002 carries a value indicating the particular frame format that supports AV streaming. For example, the Robust Action field 2002 may indicate one of a SCS Request, a SCS Response, a Group Membership Request, a Group Membership Response, an MSCS Request, or an MSCS Response. The Dialog Token field 2003 is used for matching action responses with action requests when there are multiple, concurrent action requests. The SCS Descriptor List field 2004 includes zero or more SCS Descriptor elements. If included, each SCS Descriptor element contains a TSPEC element that describes the traffic characteristics and QoS expectations of traffic flows that belong to the SCS stream corresponding to the respective SCS Descriptor element.

Figure 21:
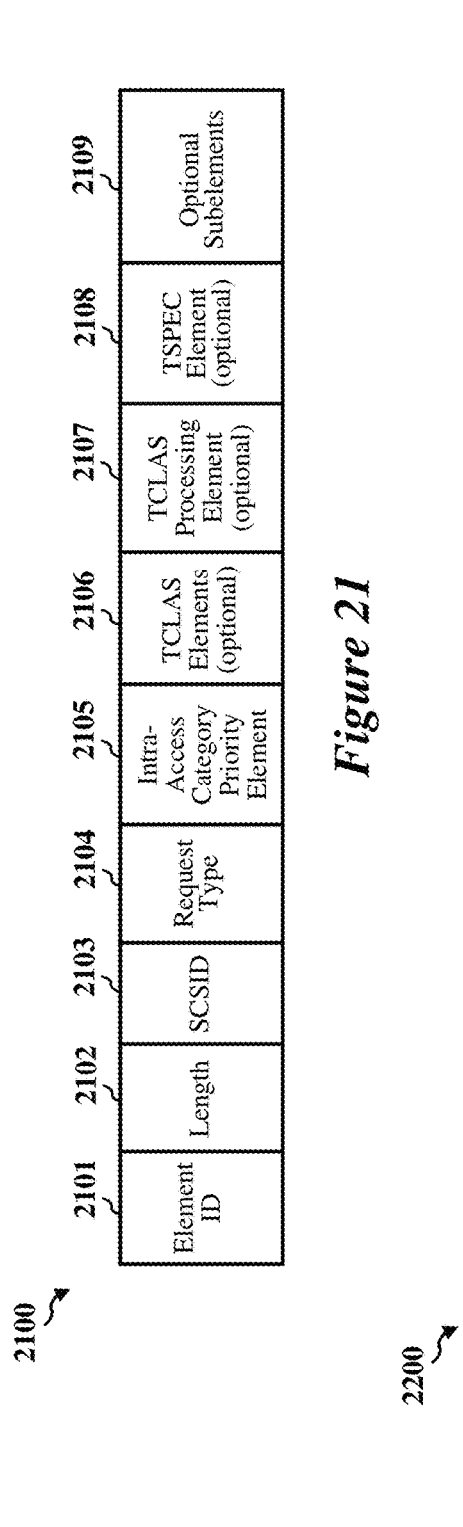
FIG. 21 shows an example structure of an SCS Descriptor element usable in the SCS request frame of FIG. 20.

FIG. 21 shows an example structure of an SCS Descriptor element 2100 usable for wireless communications that support TXOP sharing requests. The SCS Descriptor element 2100 contains the set of parameters that define the characteristics and QoS expectations of a traffic flow, in the context of a particular STA. The SCS Descriptor element 2100 includes an Element ID field 2101, a Length field 2102, a SCSID field 2103, a Request Type field 2104, an Intra-Access Category Priority Element field 2105, a Traffic Classification (TCLAS) Elements field 2106, a TCLAS Processing Element field 2107, an optional TSPEC Element field 2108, and one or more Optional Subelements fields 2109. The Element ID field 2101 may indicate that the element 2100 is a SCS Descriptor element. The Length field 2102 indicates the length of the SCS Descriptor element 2100. The SCSID field 2103 is set to a nonzero value selected by the non-AP STA identifying the SCS stream specified in the SCS Descriptor element 2100.

The Request Type field 2104 is set to a number to identify the type of SCS request. For example, the Request Type field 2104 may indicate one of Add, Remove, or Change. The Intra-Access Category Priority Element field 2105 is present when the Request Type field is equal to "Add" or "Change." The TCLAS Elements field 2106 contains zero or more TCLAS elements that specify how incoming MSDUs are classified as part of this SCS stream. One or more TCLAS elements are present when Request Type field is equal to "Add" or "Change," and no TCLAS elements are present when Request Type field is equal to "Remove." In some aspects, the TCLAS Element 2106 contains a set of parameters that can identify various kinds of PDUs or incoming MSDU that belong to a particular TS. The TCLAS Processing Element 2107 field is present when more than one TCLAS element is present in the TCLAS Elements field 2106 and contains a TCLAS Processing element 2107 that defines how the multiple TCLAS elements are to be processed.

The TSPEC Element field 2108 contains zero or one TSPEC element to describe the traffic characteristics and QoS expectations of traffic flows that belong to the SCS stream indicated by the value stored in the SCSID field 2103. In some aspects, the zero or one TSPEC element is present in the SCS Descriptor element 2100 when the Request Type field 2104 is equal to "Add" or "Change," and no TSPEC element is present in the SCS Descriptor element 2100 when the Request Type field 2104 is equal to "Remove."

Figure 22:
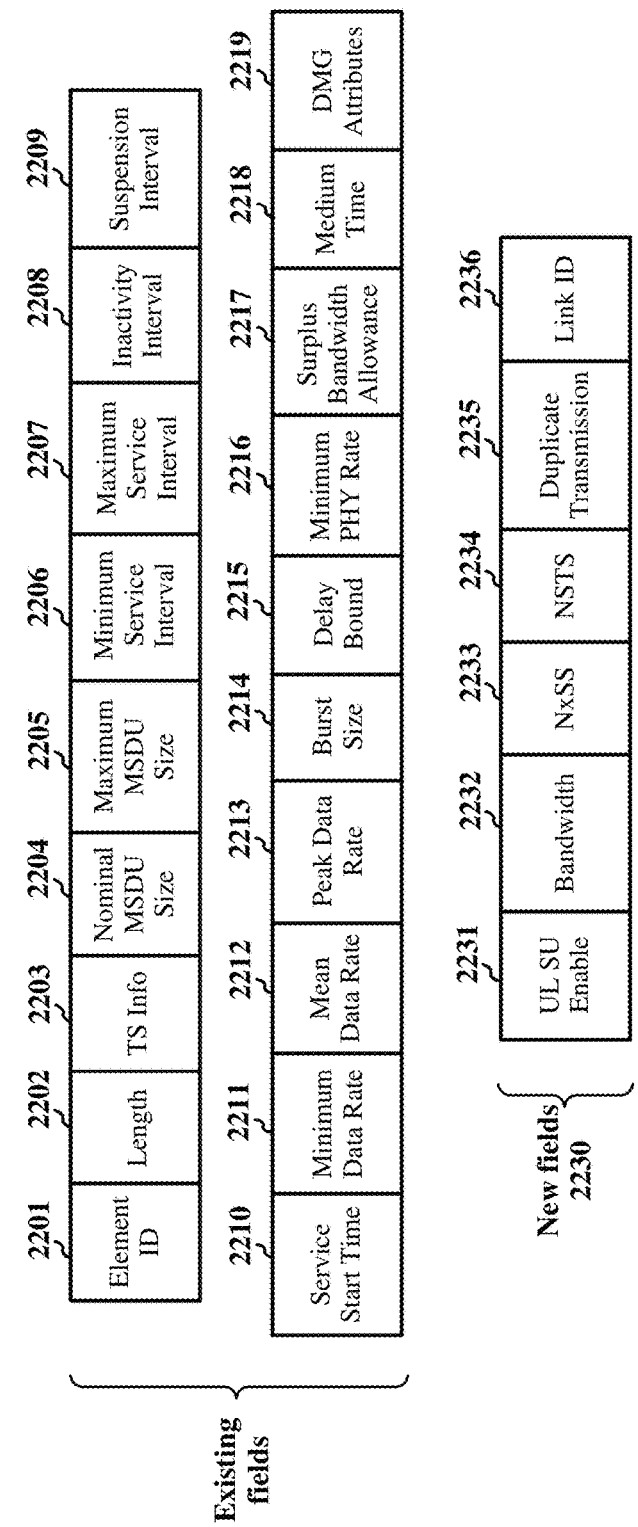
FIG. 22 shows an example structure of a Traffic Specification (TSPEC) field usable in the SCS Descriptor element of FIG. 21.

FIG. 22 shows an example structure of a TSPEC Element 2200 usable in the SCS Descriptor element 2100 of FIG. 21. The TSPEC Element 2200 contains a set of parameters that define the characteristics and QoS expectations of a traffic flow in the context of a particular STA. Specifically, the TS PEC element 2200 allows for parameters that are more extensive than may be needed, or may be available, for any particular instance of parameterized QoS traffic. The TSPEC Element 2200 may include an Element ID field 2201, a Length field 2202, a Traffic Stream (TS) Info field 2203, a Nominal MSDU Size field 2204, a Maximum MSDU Size field 2205, a Minimum Service Interval field 2206, a Maximum Service Interval field 2206, an Inactivity Interval field 2208, a Suspension Interval field 2209, a Service Start Time field 2210, a Minimum Data Rate field 2211, a Mean Data Rate field 2212, a Peak Data Rate field 2213, a Burst Size field 2214, a Delay Bound field 2215, a Minimum PHY Rate field 2216, a Surplus Bandwidth Allowance field 2217, a Medium Time field 2218, and a DMG Attributes field 2219. In some implementations, all fields other than the Element ID field 2201, the Length field 2202, the TS Info field 2203, the Minimum Service Interval field 2206, the Maximum Service Interval field 2207, the Minimum Data Rate field 2211, the Mean Data Rate field 2212, and the Delay Bound field 2215 may be omitted.

The Element ID field 2201 may indicate that the element 2200 is a TSPEC Element. In some instances, the Element ID field 2201 may indicate that the element 2200 is a reduced TSPEC Element that includes only the Element ID field 2201, the Length field 2202, the TS Info field 2203, the Minimum Service Interval field 2206, the Maximum Service Interval field 2207, the Minimum Data Rate field 2211, the Mean Data Rate field 2212, and the Delay Bound field 2215. The length field 2202 may indicate a length of the TSPEC Element 2200. The TS Info field 2203 may include the user priority (UP) for the corresponding service period. The Nominal MSDU Size field 2204 contains an unsigned integer that specifies the nominal size, in octets, of MSDUs or A-MSDUs belonging to the TS for the corresponding TSPEC. The Maximum MSDU Size field 2205 contains an unsigned integer that specifies the maximum size, in octets, of MSDUs or A-MSDUs belonging to the TS for the corresponding TSPEC. The Minimum Service Interval field 2206 may indicate the smallest allowed service interval between corresponding service periods. The Maximum Service Interval field 2207 may indicate the largest allowed service interval between corresponding service periods. The Inactivity Interval field 2208 contains an unsigned integer that specifies the minimum amount of time, in microseconds, that can elapse without arrival or transfer of an MPDU belonging to the TS before the TS is deleted by the MAC entity at the HC. The Suspension Interval field 2209 contains an unsigned integer that specifies the minimum amount of time, in microseconds, that can elapse without arrival or transfer of an MSDU belonging to the TS before the generation of successive QoS(+)CF-Poll is stopped for this TS.

The Service Start Time field 2210 indicates the time at which the next service period begins. The Minimum Data Rate field 2211 may include the minimum data rate for the corresponding service period. The Mean Data Rate field 2212 may include the mean data rate for the corresponding service period. The Peak Data Rate field 2213 may include the peak data rate for the corresponding service period. The Burst Size field 2214 and contains an unsigned integer that specifies the maximum burst, in octets, of the MSDUs or A-MSDUs belonging to this TS that arrive at the MAC SAP at the peak data rate. A value of 0 indicates that there are no bursts. The Delay Bound field 2215 may include the delay bound for the corresponding service period.

The Minimum PHY Rate field 2216 indicates the minimum PHY rate for transport of MSDUs_or A-MSDUs belonging to the corresponding TS within the bounds of the TSPEC. The Surplus Bandwidth Allowance field 2217 specifies the excess allocation of time (and bandwidth) over and above the stated application rates required to transport an MSDU or A-MSDU belonging to the TS in this TSPEC. The Medium Time field 2218 indicates the amount of time to access wireless medium (in units of 32 µs/s). The DMG Attributes field 2219 is present in the TSPEC element when the BSS to which the TSPEC applies is a DMG BSS; otherwise, the DMG Attributes field 2219 is not present.

In various implementations, the TSPEC Element 2200 may include a new field set 2230 that can be used to indicate one or more of the requested bandwidths for UL and DL transmissions, to indicate the requested quantities of spatial streams for the UL and DL transmissions, the periodicity associated with the indicated bandwidths and the indicated quantities of spatial streams, whether or not a transmitting STA is configured to transmit UL data using duplicates carried over a plurality of communication links or frequency bands, or whether the associated AP is to solicit UL data from associated STAs using Basic Trigger frames or MU-RTS TXS Trigger frames. In some instances, the new field set 2230 includes an UL SU Enable subfield 2231, a Bandwidth subfield 2232, a Number of Spatial Streams (NxSS) subfield, a Number of Space-Time Streams (NSTS) subfield, a Duplicate Transmission subfield 2235, and a Link ID subfield 2236. The UL SU Enable subfield 2231 indicates whether transmitting UL data using UL SU PPDUs is enabled. The Bandwidth subfield 2232 may indicate or request a particular bandwidth for data transmissions during a time period. The NxSS subfield 2233 indicates the quantity of spatial streams that APs are to use for DL transmissions during the time period. The NSTS subfield 2234 indicates a quantity of space-time streams that non-AP STAs are to use for UL transmissions during the service period. The Duplicate Transmission subfield 2235 indicates whether the STA intends, or is configured, to transmit UL data using duplicates carried over a plurality of communication links. The Link ID subfield 2236 indicates the communication links over which the STA is to transmit the UL data packet duplicates.

Figure 23A:
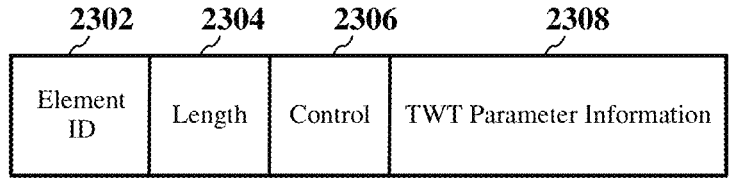
FIG. 23A shows an example structure of a Target Wake Time (TWT) Element usable for wireless communications that support TXOP sharing requests.

FIG. 23A shows an example structure of a TWT Element 2300 usable for wireless communications that support TXOP sharing requests. The TWT Element 2300 may include an element ID field 2302, a length field 2304, a control field 2306, and a TWT parameter information field 2308. The element ID field 2302 indicates that the element is a TWT Element. The length field 2304 indicates a length of the TWT Element 2300. The control field 2306 includes various control information for a restricted TWT session advertised by the TWT Element 2300. The TWT parameter information field 2308 contains either a single individual TWT Parameter Set field or one or more Broadcast TWT Parameter Set fields.

Figure 23B:
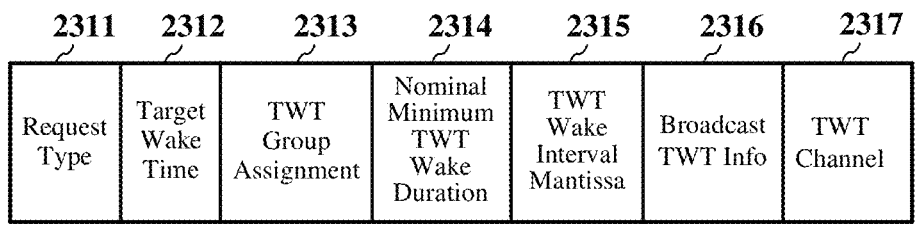
FIG. 23B shows an example structure of a broadcast TWT Parameter Set field usable in the TWT Element of FIG. 23A.

FIG. 23B shows an example structure of a broadcast TWT Parameter Set field 2310 usable in the TWT Element 2300 of FIG. 23A. The broadcast TWT Parameter Set field 2310 may include a Request Type field 2311, a Target Wake Time field 2312, a TWT Group Assignment field 2313, a Nominal Minimum TWT Wake Duration field 2314, a TWT Wake Interval Mantissa field 2315, a Broadcast TWT Info field 2316, and a TWT channel field 2317. The Request Type field 2311 indicates a type of TWT session requested. The Target Wake Time field 2312 carries an unsigned integer corresponding to a TSF time at which the STA requests to wake. TWT Group Assignment field 2313. The Nominal Minimum TWT Wake Duration field 2314 indicates the minimum amount of time that the TWT requesting STA or TWT scheduled STA is expected remain in an awake state or mode. The TWT Wake Interval Mantissa field 2315 may be set to a non-zero value a periodic TWT and a zero value for an aperiodic TWT. The Broadcast TWT Info field 2316 may include a broadcast TWT ID for a corresponding restricted TWT session, and may carry information indicating the number of TBTTs during which the Broadcast TWT SPs corresponding to the broadcast TWT Parameter set are present.

Figure 23C:
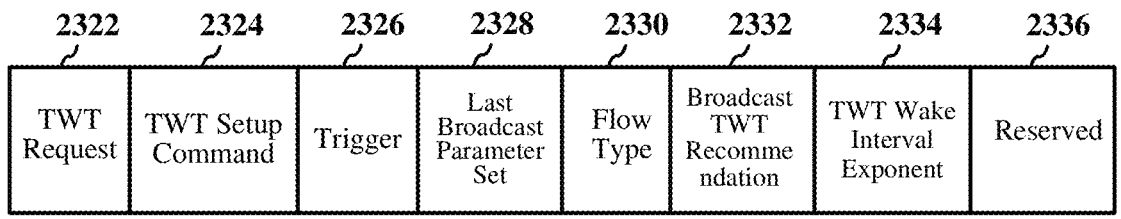
FIG. 23C shows an example structure of a Request Type field usable in the Broadcast TWT Parameter Set field of FIG. 23B.

FIG. 23C shows an example structure of a Request Type field 2320 usable in the Broadcast TWT Parameter Set field 2310 of FIG. 23B. The Request Type field 2320 may include a TWT Request subfield 2322, a TWT setup command subfield 2324, a trigger subfield 2326, a Last Broadcast Parameter Set subfield 2328, a Flow Type subfield 2330, a Broadcast TWT Recommendation subfield 2332, a TWT Wake Interval Exponent subfield 2334, and a number of reserved bits 2336. The TWT Request subfield 2322 may carry a value indicating whether the corresponding TWT Information Element was transmitted by a scheduled STA or by a scheduling STA. The TWT Setup Command subfield 2324 may carry values that indicate the type of TWT commands carried in the TWT Information Element. The Trigger subfield 2326 may indicate whether or not the TWT SP indicated by the TWT Element 2300 includes trigger frames or frames carrying a TRS Control subfield.

The Last Broadcast Parameter Set subfield 2328 indicates whether another broadcast TWT Parameter Set follows. For example, the Last Broadcast Parameter Set subfield 2328 may be set to a value of 0 to indicate that there is another TWT Parameter set following this set, or may be set to a value of 1 to indicate that this is the last broadcast TWT Parameter set in the broadcast TWT element. The Flow Type subfield 2330 indicates the type of interaction between the TWT requesting STA or TWT scheduled STA and the TWT responding STA or TWT scheduling AP at a TWT. For example, setting the Flow Type subfield 2330 to a value of 0 indicates an announced TWT in which the TWT requesting STA or the TWT scheduled STA sends a PS-Poll or an APSD trigger frame to signal its awake state. Setting the Flow Type subfield 2330 to a value of 1 indicates an unannounced TWT in which the TWT responding STA or TWT scheduling AP will send a frame to the TWT requesting STA or TWT scheduled STA at TWT without waiting to receive a PS-Poll or an APSD trigger frame.

The Broadcast TWT Recommendation subfield 2332 contains a value that indicates recommendations on the types of frames that are transmitted by TWT scheduled STAs and scheduling AP during the broadcast TWT SP, encoded according to the Broadcast TWT Recommendation subfield 2332 for a broadcast TWT element. In some instances, the Broadcast TWT Recommendation subfield 2332 may indicate whether the restricted TWT session is a peer-to-peer TWT session or a broadcast TWT session. The TWT Wake Interval Exponent subfield 2334 carries a value from which the TWT wake interval can be obtained. In some instances, the TWT Wake Interval Exponent subfield 2334 is set to the value of the exponent of the TWT Wake Interval value in microseconds, base 2.

Figure 24:
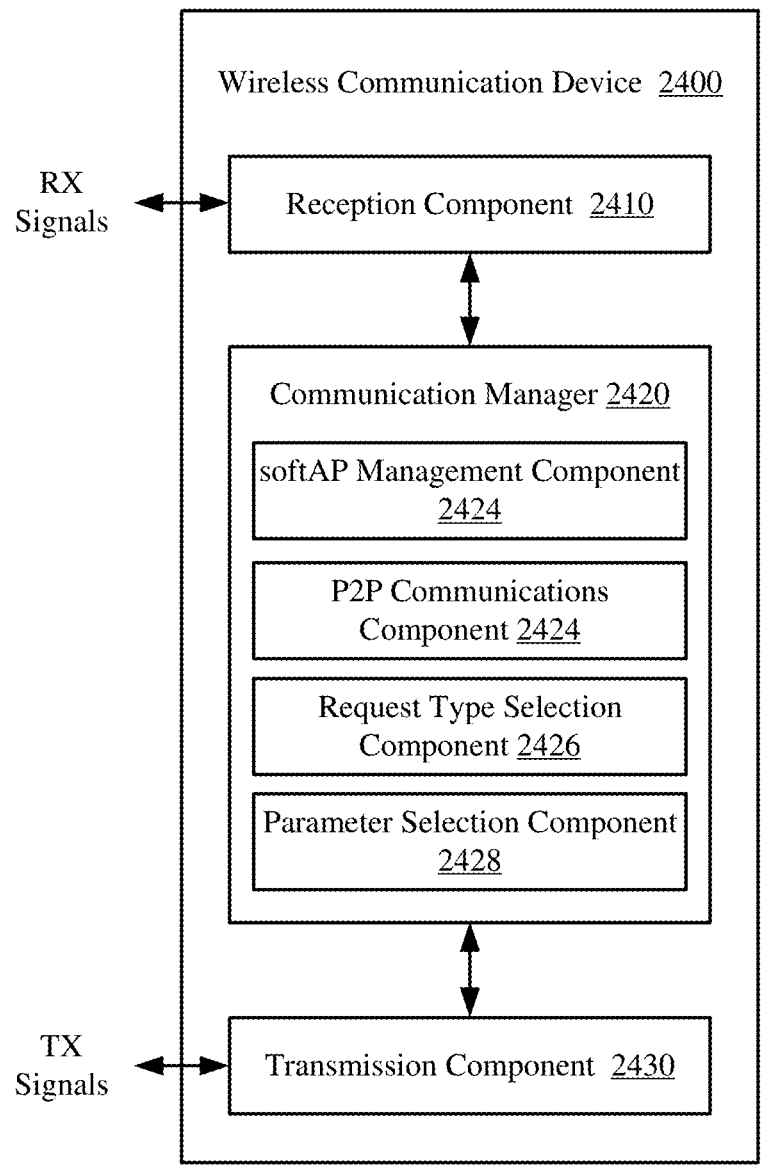
FIG. 24 shows a block diagram of an example wireless communication device, according to some implementations.

FIG. 24 shows a block diagram of an example wireless communication device 2400. In some implementations, the wireless communication device 2400 may be configured to perform one or more of the processes 1000, 1100, 1200, 1300, or 1400 described above with reference to FIGS. 10, 11, 12, 13, and 14, respectively. The wireless communication device 2400 can be an example implementation of any of the STAs 104 of FIG. 1, the wireless communication device 500 of FIG. 5, or the STA 604 of FIG. 6B. More specifically, the wireless communication device 2400 can be a chip, SoC, chipset, package or device that includes at least one processor and at least one modem (for example, a Wi-Fi (IEEE 802.11) modem or a cellular modem).

The wireless communication device 2400 includes a reception component 2410, a communication manager 2420, and a transmission component 2430. The communication manager 2420 further includes a softAP management component 2422, a P2P communications component 2424, a request type selection component 2426, and a parameter selection component 2428. Portions of one or more of the components 2422, 2424, 2426, and 2428 may be implemented at least in part in hardware or firmware. In some implementations, one or more of the components 2422, 2424, 2426, and 2428 are implemented at least in part as software stored in a memory (such as the memory 508 of FIG. 5). For example, portions of one or more of the components 2422 or 2424 can be implemented as non-transitory instructions (or "code") executable by a processor (such as the processor 506 of FIG. 5) to perform the functions or operations of the respective component.

The reception component 2410 is configured to receive RX signals from one or more other wireless communication devices, and the transmission component 2430 is configured to transmit TX signals to one or more other wireless communication devices. The communication manager 2420 is configured to manage wireless communications with one or more other wireless communication devices. In some implementations, the softAP management component 2422 may implement or manage a softAP collocated or otherwise associated with the wireless communication device 2400. The P2P communications component 2424 may request an AP to allocate a portion of a TXOP obtained on the wireless medium for P2P communications between the wireless communication device 2400 and a client device associated with the wireless communication device 2400. The P2P communications component 2424 also may transmit a trigger frame to the client device to solicit P2P transmissions from the client device.

Implementation examples are described in the following numbered clauses:

1. A wireless communication device, including: a processing system; and
    an interface coupled to the processing system, the interface configured to:
       transmit a first frame to an access point (AP), the first frame indicating a bandwidth for uplink (UL) transmissions associated with a time period and a bandwidth for downlink (DL) transmissions associated with the time period;
       receive a trigger frame from the AP, the trigger frame indicating that the wireless communication device is scheduled to transmit or receive data during a time period; and
       transmit data to, or receive data from, one or more other wireless communication devices during at least the time period.
2. The wireless communication device of clause 1, where the indicated bandwidth for UL transmissions is different than the indicated bandwidth for DL transmissions.
3. The wireless communication device of any one or more of clauses 1-2, where the trigger frame includes a multi-user (MU) Request-to-Send (RTS) Transmission Opportunity (TXOP) Sharing (TXS) trigger frame allocating a portion of a TXOP obtained by the AP to the wireless communication device.
4. The wireless communication device of clause 3, where the MU-RTS TXS Trigger frame is configured to solicit a Single-User (SU) transmission of UL data from the wireless communication device.
5. The wireless communication device of clause 3, where the interface is further configured to:
    exchange peer-to-peer (P2P) communications with a client device associated with the wireless communication device during the allocated portion of the TXOP.
6. The wireless communication device of any one or more of clauses 1-4, where the first frame includes a Target Wake Time (TWT) request frame including a request for the AP to schedule a TWT service period (SP) for latency-sensitive traffic or peer-to-peer (P2P) communications associated with the wireless communication device.
7. The wireless communication device of clause 6, where the TWT request frame indicates a quantity of spatial streams for UL transmissions during the TWT SP, and indicates a quantity of spatial streams for DL transmissions during the TWT SP.
8. The wireless communication device of clause 7, where the quantity of spatial streams for UL transmissions is different than the quantity of spatial streams for DL transmissions.
9. The wireless communication device of any one or more of clauses 7-8, where the respective bandwidths and quantities of spatial streams for the UL and DL transmissions are indicated in one of a TWT Element or a new Information Element (IE) carried in the TWT request frame.
10. The wireless communication device of any one or more of clauses 7-9, where the TWT request frame further indicates a periodicity associated with the indicated bandwidths and the indicated quantities of spatial streams.
11. The wireless communication device of any one or more of clauses 7-10, where the TWT request frame further indicates an intention of the wireless communication device to transmit UL data using duplicates carried on a plurality of wireless channels or communication links.
12. The wireless communication device of any one or more of clauses 1-11, where the first frame includes a Stream Classification Service (SCS) request frame including a request for the AP to create an SCS stream for a class of traffic associated with a Quality-of-Service (QoS) period.

13. The wireless communication device of clause 12, where the SCS request frame indicates an intention of the wireless communication device to transmit UL data using duplicates carried on a plurality of wireless channels or communication links.

14. The wireless communication device of any one or more of clauses 12-13, where the SCS request frame indicates a quantity of spatial streams for UL transmissions during the QoS period, and indicates a quantity of spatial streams for DL transmissions during the QoS period.

15. The wireless communication device of clause 14, where the quantity of spatial streams for UL transmissions is different than the quantity of spatial streams for DL transmissions.

16. The wireless communication device of any one or more of clauses 14-15, where the SCS request frame further indicates a periodicity associated with the indicated bandwidths and the indicated quantities of spatial streams.

17. The wireless communication device of any one or more of clauses 14-16, where the respective bandwidths and quantities of spatial streams for the UL and DL transmissions are indicated in one of a Traffic Specification (TSPEC) Element, a Quality-of-Service (QoS) Characteristics Element, or a new Information Element (IE) carried in the SCS request frame.

18. The wireless communication device of clause 17, where the TSPEC Element or the QoS Characteristics Element includes an uplink (UL) Single-User (SU) subfield indicating whether the AP is to solicit UL data using Basic Trigger frames or multi-user (MU) Request-to-Send (RTS) Transmission Opportunity (TXOP) Sharing (TXS) trigger frames.

19. The wireless communication device of any one or more of clauses 17-18, where the TSPEC Element or the QoS Characteristics Element includes at least one of:
a Bandwidth subfield indicating a bandwidth for transmitting trigger-based (TB) PPDUs or a bandwidth for transmitting DL PPDUs;
a Number of Spatial Streams (NxSS) subfield indicating the quantity of spatial streams to use for DL transmissions during the service period; or
a Number of Space-Time Streams (NSTS) subfield indicating a quantity of space-time streams to use for UL transmissions during the service period.

20. The wireless communication device of clause 19, where the TSPEC Element or the QoS Characteristics Element further includes:
a Duplicate Transmission subfield indicating whether or not the wireless communication device is configured to transmit UL data using duplicates carried over a plurality of wireless channels or communication links.

21. The wireless communication device of clause 20, where the TSPEC Element or the QoS Characteristics Element further includes:
a Link Identification (ID) subfield indicating each communication link over which the duplicates are transmitted.

22. The wireless communication device of any one or more of clauses 1-21, where the MAC header of the first frame includes an Aggregated-Control (A-Control) subfield including an Operating Mode (OM) Control subfield indicating whether the AP is to solicit UL data using Basic Trigger frames or multi-user (MU) Request-to-Send (RTS) Transmission Opportunity (TXOP) Sharing (TXS) trigger frames.

23. The wireless communication device of clause 22, where setting a reserved bit in each subfield of an UL MU Disable subfield and an UL MU Data Disable subfield included in the OM Control subfield set to a value of 1 indicates that the AP is to disable Basic Trigger frames during the time period and is to solicit UL data from the wireless communication device using MU-RTS TXS Trigger frames.

24. The wireless communication device of any one or more of clauses 22-23, where setting a reserved bit in each subfield of an UL MU Disable subfield and an UL MU Data Disable subfield included in the OM Control subfield set to a value of 1 indicates that the AP is to disable MU-RTS TXS Trigger frames during the time period and is to solicit UL data from the wireless communication device using Basic Trigger frames.

25. The wireless communication device of clauses 25, where the interface is further configured to:
receive a second frame from the AP, the second frame confirming the indicated bandwidths for the UL and DL transmissions.

26. The wireless communication device of clause 25, where the second frame is a Target Wake Time (TWT) response frame or a Stream Classification Service (SCS) response frame.

27. The wireless communication device of any one or more of clauses 1-26, where transmitting or receiving the data includes:
transmitting latency-sensitive traffic to, or receiving latency-sensitive traffic from, a client device during the time period indicated by the trigger frame.

28. The wireless communication device of clause 27, where the processing system is configured to:
operate as a wireless station (STA) associated with the AP while operating as a softAP with which the client device is associated.

29. A method performed by a wireless communication device, including:
transmitting a first frame to an access point (AP), the first frame indicating a bandwidth for uplink (UL) transmissions associated with a time period and a bandwidth for downlink (DL) transmissions associated with the time period;
receiving a trigger frame from the AP, the trigger frame indicating that the wireless communication device is scheduled to transmit or receive data during a time period; and
transmitting data to, or receiving data from, one or more other wireless communication devices during at least the time period.

30. The method of clause 29, where the indicated bandwidth for UL transmissions is different than the indicated bandwidth for DL transmissions.

31. The method of any one or more of clauses 29-30, where the trigger frame includes a multi-user (MU) Request-to-Send (RTS) Transmission Opportunity (TXOP) Sharing (TXS) trigger frame allocating a portion of a TXOP obtained by the AP to the wireless communication device.

32. The method of clause 31, where the MU-RTS TXS Trigger frame is configured to solicit a Single-User (SU) transmission of UL data from the wireless communication device.

33. The method of any one or more of clauses 29-32, further including:
exchanging peer-to-peer (P2P) communications with a client device associated with the wireless communication device during the allocated portion of the TXOP.
34. The method of any one or more of clauses 29-33, where the first frame includes a Target Wake Time (TWT) request frame including a request for the AP to schedule a TWT service period (SP) for latency-sensitive traffic or peer-to-peer (P2P) communications associated with the wireless communication device.
35. The method of clause 34, where the TWT request frame indicates a quantity of spatial streams for UL transmissions during the TWT SP, and indicates a quantity of spatial streams for DL transmissions during the TWT SP.
36. The method of clause 35, where the quantity of spatial streams for UL transmissions is different than the quantity of spatial streams for DL transmissions.
37. The method of any one or more of clauses 35-36, where the respective bandwidths and quantities of spatial streams for the UL and DL transmissions are indicated in one of a TWT Element or a new Information Element (IE) carried in the TWT request frame.
38. The method of any one or more of clauses 35-37, where the TWT request frame further indicates a periodicity associated with the indicated bandwidths and the indicated quantities of spatial streams.
39. The method of any one or more of clauses 35-39, where the TWT request frame further indicates an intention of the wireless communication device to transmit UL data using duplicates carried on a plurality of wireless channels or communication links.
40. The method of clause 29, where the first frame includes a Stream Classification Service (SCS) request frame including a request for the AP to create an SCS stream for a class of traffic associated with a Quality-of-Service (QoS) period.
41. The method of clause 40, where the SCS request frame indicates an intention of the wireless communication device to transmit UL data using duplicates carried on a plurality of wireless channels or communication links.
42. The method of any one or more of clauses 40-41, where the SCS request frame indicates a quantity of spatial streams for UL transmissions during the QoS period, and indicates a quantity of spatial streams for DL transmissions during the QoS period.
43. The method of clause 44, where the quantity of spatial streams for UL transmissions is different than the quantity of spatial streams for DL transmissions.
44. The method of any one or more of clauses 42-44, where the SCS request frame further indicates a periodicity associated with the indicated bandwidths and the indicated quantities of spatial streams.
45. The method of any one or more of clauses 42-44, where the respective bandwidths and quantities of spatial streams for the UL and DL transmissions are indicated in one of a Traffic Specification (TSPEC) Element, a Quality-of-Service (QoS) Characteristics Element, or a new Information Element (IE) carried in the SCS request frame.
46. The method of clause 45, where the TSPEC Element or the QoS Characteristics Element includes an uplink (UL) Single-User (SU) subfield indicating whether the AP is to solicit UL data using Basic Trigger frames or multi-user (MU) Request-to-Send (RTS) Transmission Opportunity (TXOP) Sharing (TXS) trigger frames.
47. The method of any one or more of clauses 45-46, where the TSPEC Element or the QoS Characteristics Element includes at least one of:
a Bandwidth subfield indicating a bandwidth for transmitting trigger-based (TB) PPDUs or a bandwidth for transmitting DL PPDUs;
a Number of Spatial Streams (NxSS) subfield indicating the quantity of spatial streams to use for DL transmissions during the service period; or
a Number of Space-Time Streams (NSTS) subfield indicating a quantity of space-time streams to use for UL transmissions during the service period.
48. The method of clause 47, where the TSPEC Element or the QoS Characteristics Element further includes:
a Duplicate Transmission subfield indicating whether or not the wireless communication device is configured to transmit UL data using duplicates carried over a plurality of wireless channels or communication links.
49. The method of clause 48, where the TSPEC Element or the QoS Characteristics Element further includes:
a Link Identification (ID) subfield indicating each communication link over which the duplicates are transmitted.
50. The method of any one or more of clauses 29-49, where the MAC header of the first frame includes an Aggregated-Control (A-Control) subfield including an Operating Mode (OM) Control subfield indicating whether the AP is to solicit UL data using Basic Trigger frames or multi-user (MU) Request-to-Send (RTS) Transmission Opportunity (TXOP) Sharing (TXS) trigger frames.
51. The method of clause 50, where setting a reserved bit in each subfield of an UL MU Disable subfield and an UL MU Data Disable subfield included in the OM Control subfield set to a value of 1 indicates that the AP is to disable Basic Trigger frames during the time period and to solicit UL data from the wireless communication device using MU-RTS TXS Trigger frames.
52. The method of any one or more of clauses 50-51, where setting a reserved bit in each subfield of an UL MU Disable subfield and an UL MU Data Disable subfield included in the OM Control subfield to a value of 1 indicates that the AP is to disable MU-RTS TXS Trigger frames during the time period and is to solicit UL data from the wireless communication device using Basic Trigger frames.
53. The method of any one or more of clauses 29-52, further including:
receiving a second frame from the AP, the second frame confirming the indicated bandwidths for the UL and DL transmissions.
54. The method of clause 53, where the second frame is a Target Wake Time (TWT) response frame or a Stream Classification Service (SCS) response frame.
55. The method of any one or more of clauses 29-54, where transmitting or receiving the data includes:
transmitting latency-sensitive traffic to, or receiving latency-sensitive traffic from, a client device during the time period indicated by the trigger frame.
56. The method of clause 55, further including:
operating as a wireless station (STA) associated with the AP while operating as a softAP with which the client device is associated.
57. The method of any one or more of clauses 29-56, where the TWT request frame further indicates whether the AP is to solicit UL data using Basic Trigger frames or multi-user (MU) Request-to-Send (RTS) Transmission Opportunity (TXOP) Sharing (TXS) trigger frame.

58. An access point (AP), including:
a processing system; and
an interface coupled to the processing system, the interface configured to:
  receive a first frame from a wireless station (STA), the first frame indicating a bandwidth for uplink (UL) transmissions associated with a time period and a bandwidth for downlink (DL) transmissions associated with the time period;
  transmit a trigger frame to the STA, the trigger frame indicating that the STA is scheduled to transmit or receive data during a time period; and
  schedule the transmission of data to, or the reception of data from, the STA during at least the time period.
59. The AP of clause 58, where the indicated bandwidth for UL transmissions is different than the indicated bandwidth for DL transmissions.
60. The AP of any one or more of clauses 58-59, where the trigger frame includes a multi-user (MU) Request-to-Send (RTS) Transmission Opportunity (TXOP) Sharing (TXS) trigger frame allocating a portion of a TXOP obtained by the AP to the STA.
61. The AP of clause 60, where the MU-RTS TXS Trigger frame is configured to solicit a Single-User (SU) transmission of UL data from the STA.
62. The AP of clause 60, where the interface is further configured to:
facilitate peer-to-peer (P2P) communications between the STA and a client device associated with the STA during the allocated portion of the TXOP.
63. The AP of any one or more of clauses 58-62, where the first frame includes a Target Wake Time (TWT) request frame including a request for the AP to schedule a TWT service period (SP) for latency-sensitive traffic or peer-to-peer (P2P) communications associated with the STA.
64. The AP of clause 63, where the TWT request frame indicates a quantity of spatial streams for UL transmissions during the TWT SP, and indicates a quantity of spatial streams for DL transmissions during the TWT SP.
65. The AP of clause 64, where the quantity of spatial streams for UL transmissions is different than the quantity of spatial streams for DL transmissions.
66. The AP of any one or more of clauses 64-65, where the respective bandwidths and quantities of spatial streams for the UL and DL transmissions are indicated in one of a TWT Element or a new Information Element (IE) carried in the TWT request frame.
67. The AP of any one or more of clauses 64-66, where the TWT request frame further indicates a periodicity associated with the indicated bandwidths and the indicated quantities of spatial streams.
68. The AP of any one or more of clauses 64-67, where the TWT request frame further indicates an intention of the STA to transmit UL data using duplicates carried on a plurality of wireless channels or communication links.
69. The AP of any one or more of clauses 58-68, where the first frame includes a Stream Classification Service (SCS) request frame including a request for the AP to create an SCS stream for a class of traffic associated with a Quality-of-Service (QoS) period.
70. The AP of clause 69, where the SCS request frame indicates an intention of the STA to transmit UL data using duplicates carried on a plurality of wireless channels or communication links.
71. The AP of any one or more of clauses 69-70, where the SCS request frame indicates a quantity of spatial streams for UL transmissions during the QoS period, and indicates a quantity of spatial streams for DL transmissions during the QoS period.
72. The AP of clause 71, where the quantity of spatial streams for UL transmissions is different than the quantity of spatial streams for DL transmissions.
73. The AP of any one or more of clauses 71-72, where the SCS request frame further indicates a periodicity associated with the indicated bandwidths and the indicated quantities of spatial streams.
74. The AP of any one or more of clauses 71-73, where the respective bandwidths and quantities of spatial streams for the UL and DL transmissions are indicated in one of a Traffic Specification (TSPEC) Element, a Quality-of-Service (QoS) Characteristics Element, or a new Information Element (IE) carried in the SCS request frame.
75. The AP of clause 74, where the TSPEC Element or the QoS Characteristics Element includes an uplink (UL) Single-User (SU) subfield indicating whether the AP is to solicit UL data using Basic Trigger frames or multi-user (MU) Request-to-Send (RTS) Transmission Opportunity (TXOP) Sharing (TXS) trigger frames.
76. The AP of any one or more of clauses 74-75, where the TSPEC Element or the QoS Characteristics Element includes at least one of:
a Bandwidth subfield indicating a bandwidth for transmitting trigger-based (TB) PPDUs or a bandwidth for transmitting DL PPDUs;
a Number of Spatial Streams (NxSS) subfield indicating the quantity of spatial streams to use for DL transmissions during the service period; or
a Number of Space-Time Streams (NSTS) subfield indicating a quantity of space-time streams to use for UL transmissions during the service period.
77. The AP of clause 76, where the TSPEC Element or the QoS Characteristics Element further includes:
a Duplicate Transmission subfield indicating whether or not the STA is configured to transmit UL data using duplicates carried over a plurality of wireless channels or communication links.
78. The AP of clause 77, where the TSPEC Element or the QoS Characteristics Element further includes:
a Link Identification (ID) subfield indicating each communication link over which the duplicates are transmitted.
79. The AP of any one or more of clauses 58-78, where the MAC header of the first frame includes an Aggregated-Control (A-Control) subfield including an Operating Mode (OM) Control subfield indicating whether the AP is to solicit UL data using Basic Trigger frames or multi-user (MU) Request-to-Send (RTS) Transmission Opportunity (TXOP) Sharing (TXS) trigger frames.
80. The AP of clause 79, where setting a reserved bit in each subfield of an UL MU Disable subfield and an UL MU Data Disable subfield included in the OM Control subfield set to a value of 1 indicates that the AP is to disable Basic Trigger frames during the time period and is to solicit UL data from the STA using MU-RTS TXS Trigger frames.
81. The AP of any one or more of clauses 79-80, where setting a reserved bit in each subfield of an UL MU Disable subfield and an UL MU Data Disable subfield included in the OM Control subfield set to a value of 1 indicates that the AP is to disable MU-RTS TXS Trigger frames during the time period and is to solicit UL data from the STA using Basic Trigger frames.

82. The AP of clauses 81, where the interface is further configured to:
transmit a second frame to the STA, the second frame confirming the indicated bandwidths for the UL and DL transmissions.

83. The AP of clause 81, where the second frame is a Target Wake Time (TWT) response frame or a Stream Classification Service (SCS) response frame.

84. The AP of any one or more of clauses 58-83, where transmitting or receiving the data includes:
facilitating the transmission of latency-sensitive traffic to or from a client device associated with the STA during the time period indicated by the trigger frame.

85. A method performed by an access point (AP), including:
receiving a first frame from a wireless station (STA), the first frame indicating a bandwidth for uplink (UL) transmissions associated with a time period and a bandwidth for downlink (DL) transmissions associated with the time period;
transmitting a trigger frame to the STA, the trigger frame indicating that the STA is scheduled to transmit or receive data during a time period; and
transmitting data to, or receiving data from, one or more other wireless communication devices during at least the time period.

86. The method of clause 85, where the indicated bandwidth for UL transmissions is different than the indicated bandwidth for DL transmissions.

87. The method of any one or more of clauses 85-86, where the trigger frame includes a multi-user (MU) Request-to-Send (RTS) Transmission Opportunity (TXOP) Sharing (TXS) trigger frame allocating a portion of a TXOP obtained by the AP to the wireless communication device.

88. The method of clause 87, where the MU-RTS TXS Trigger frame is configured to solicit a Single-User (SU) transmission of UL data from the wireless communication device.

89. The method of any one or more of clauses 85-88, where the first frame includes a Target Wake Time (TWT) request frame including a request for the AP to schedule a TWT service period (SP) for latency-sensitive traffic or peer-to-peer (P2P) communications associated with the wireless communication device.

90. The method of clause 89, where the TWT request frame indicates a quantity of spatial streams for UL transmissions during the TWT SP, and indicates a quantity of spatial streams for DL transmissions during the TWT SP.

91. The method of clause 90, where the quantity of spatial streams for UL transmissions is different than the quantity of spatial streams for DL transmissions.

92. The method of any one or more of clauses 90-91, where the respective bandwidths and quantities of spatial streams for the UL and DL transmissions are indicated in one of a TWT Element or a new Information Element (IE) carried in the TWT request frame.

93. The method of any one or more of clauses 90-92, where the TWT request frame further indicates a periodicity associated with the indicated bandwidths and the indicated quantities of spatial streams.

94. The method of any one or more of clauses 90-93, where the TWT request frame further indicates an intention of the wireless communication device to transmit UL data using duplicates carried on a plurality of wireless channels or communication links.

95. The method of clause 58, where the first frame includes a Stream Classification Service (SCS) request frame including a request for the AP to create an SCS stream for a class of traffic associated with a Quality-of-Service (QoS) period.

96. The method of clause 95, where the SCS request frame indicates an intention of the wireless communication device to transmit UL data using duplicates carried on a plurality of wireless channels or communication links.

97. The method of any one or more of clauses 95-96, where the SCS request frame indicates a quantity of spatial streams for UL transmissions during the QoS period, and indicates a quantity of spatial streams for DL transmissions during the QoS period.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A wireless communication device, comprising:
one or more processors; and
one or more memories coupled to the one or more processors, the one or more processors configured to:
transmit a Stream Classification Service (SCS) request frame to an access point (AP), wherein the SCS request frame includes a request for the AP to create an SCS stream for a class of traffic associated with a Quality of Service (QOS) period, and further includes one or both of an indication of a bandwidth for transmissions associated with the QOS period or an indication of a quantity of spatial streams for the transmissions during the QoS period;
receive, from the AP, a response frame comprising an acknowledgement of reception of the SCS request frame;
receive, based at least in part on the response frame, a trigger frame from the AP, the trigger frame indicating that the wireless communication device is scheduled to transmit or receive data during the QoS period via the bandwidth; and
transmit data to, or receive data from, one or more other wireless communication devices during at least the QoS period via the bandwidth.

2. The wireless communication device of claim 1, wherein the trigger frame comprises a multi-user (MU) Request-to-Send (RTS) Transmission Opportunity (TXOP) Sharing (TXS) trigger frame allocating a portion of a TXOP obtained by the AP to the wireless communication device.

3. The wireless communication device of claim 2, wherein the MU-RTS TXOP TXS Trigger frame is configured to solicit a Single-User (SU) transmission of data from the wireless communication device.

4. The wireless communication device of claim 2, wherein the one or more processors are further configured to:
exchange peer-to-peer (P2P) communications with a client device associated with the wireless communication device during the allocated portion of the TXOP.

5. The wireless communication device of claim 1, wherein the SCS request frame indicates an intention of the wireless communication device to transmit data using duplicates carried on a plurality of wireless channels or communication links.

6. The wireless communication device of claim 1, wherein the SCS request frame further indicates a periodicity associated with the indicated bandwidth or the indicated quantity of spatial streams.

7. The wireless communication device of claim 1, wherein the bandwidth or the quantity of spatial streams for the transmissions are indicated in one of a Traffic Specification (TSPEC) Element, a Quality-of-Service (QOS) Characteristics Element, or a new Information Element (IE) carried in the SCS request frame.

8. The wireless communication device of claim 7, wherein the TSPEC Element or the QoS Characteristics Element includes an uplink (UL) Single-User (SU) subfield indicating whether the AP is to solicit UL data using Basic Trigger frames or multi-user (MU) Request-to-Send (RTS) Transmission Opportunity (TXOP) Sharing (TXS) trigger frames.

9. The wireless communication device of claim 7, wherein the TSPEC Element or the QoS Characteristics Element includes at least one of:
a Bandwidth subfield indicating a bandwidth for transmitting trigger-based (TB) physical layer convergence protocol (PLCP) protocol data units (PPDUs) or a bandwidth for transmitting downlink (DL) PPDUs;
a Number of Spatial Streams (NxSS) subfield indicating the quantity of spatial streams to use for DL transmissions during a service period; or
a Number of Space-Time Streams (NSTS) subfield indicating a quantity of space-time streams to use for uplink (UL) transmissions during the service period.

10. The wireless communication device of claim 9, wherein the TSPEC Element or the QoS Characteristics Element further includes:
a Duplicate Transmission subfield indicating whether or not the wireless communication device is configured to transmit UL data using duplicates carried over a plurality of wireless channels or communication links.

11. The wireless communication device of claim 10, wherein the TSPEC Element or the QoS Characteristics Element further includes:
a Link Identification (ID) subfield indicating each communication link over which the duplicates are transmitted.

12. The wireless communication device of claim 1, wherein a Medium Access Control (MAC) header of the SCS request frame includes an Aggregated-Control (A-Control) subfield including an Operating Mode (OM) Control subfield indicating whether the AP is to solicit uplink (UL) data using Basic Trigger frames or multi-user (MU) Request-to-Send (RTS) Transmission Opportunity (TXOP) Sharing (TXS) trigger frames.

13. The wireless communication device of claim 12, wherein setting a reserved bit in each subfield of an UL MU Disable subfield and an UL MU Data Disable subfield included in the OM Control subfield set to a value of 1 indicates that the AP is to disable Basic Trigger frames during the QoS period and is to solicit UL data from the wireless communication device using MU-RTS TXS Trigger frames.

14. The wireless communication device of claim 12, wherein setting a reserved bit in each subfield of an UL MU Disable subfield and an UL MU Data Disable subfield included in the OM Control subfield set to a value of 1 indicates that the AP is to disable MU-RTS TXS Trigger frames during the QoS period and is to solicit UL data from the wireless communication device using Basic Trigger frames.

15. The wireless communication device of claim 1, wherein the one or more processors are configured to:
operate as a wireless station (STA) associated with the AP while operating as a softAP with which a client device is associated.

16. The wireless communication device of claim 1, wherein the SCS request frame comprises an element that includes a medium time field, the medium time field indicating an amount of time to access a wireless medium.

17. The wireless communication device of claim 1, wherein the one or more processors are further configured to:
monitor for the trigger frame based at least in part on the response frame.

18. A method performed by a wireless communication device, comprising:
transmitting a Stream Classification Service (SCS) request frame to an access point (AP), wherein the SCS request frame includes a request for the AP to create an SCS stream for a class of traffic associated with a Quality of Service (QOS) period, and further includes one or both of an indication of a bandwidth for transmissions associated with the QoS period or an indication of a quantity of spatial streams for the transmissions during the QoS period;
receiving, from the AP, a response frame comprising an acknowledgement of reception of the SCS request frame;
receiving, based at least in part on the response frame, a trigger frame from the AP, the trigger frame indicating that the wireless communication device is scheduled to transmit or receive data during the QoS period via the bandwidth; and
transmitting data to, or receiving data from, one or more other wireless communication devices during at least the QoS period via the bandwidth.

19. The method of claim 18, wherein the SCS request frame indicates an intention of the wireless communication device to transmit data using duplicates carried on a plurality of wireless channels or communication links.

20. The method of claim 18, wherein the bandwidth or the quantity of spatial streams for the transmissions are indicated in one of a Traffic Specification (TSPEC) Element, a Quality-of-Service (QOS) Characteristics Element, or a new Information Element (IE) carried in the SCS request frame.

21. The method of claim 20, wherein the TSPEC Element or the QoS Characteristics Element includes an uplink (UL) Single-User (SU) subfield indicating whether the AP is to solicit UL data using Basic Trigger frames or multi-user (MU) Request-to-Send (RTS) Transmission Opportunity (TXOP) Sharing (TXS) trigger frames.

22. The method of claim 18, wherein a Medium Access Control (MAC) header of the SCS request frame includes an Aggregated-Control (A-Control) subfield including an Operating Mode (OM) Control subfield indicating whether the AP is to solicit uplink (UL) data using Basic Trigger frames or multi-user (MU) Request-to-Send (RTS) Transmission Opportunity (TXOP) Sharing (TXS) trigger frames.

23. The method of claim 22, wherein setting a reserved bit in each subfield of an UL MU Disable subfield and an UL MU Data Disable subfield included in the OM Control subfield set to a value of 1 indicates that the AP is to disable Basic Trigger frames during the QoS period and to solicit UL data from the wireless communication device using MU-RTS TXS Trigger frames.

24. The method of claim 22, wherein setting a reserved bit in each subfield of an UL MU Disable subfield and an UL MU Data Disable subfield included in the OM Control subfield to a value of 1 indicates that the AP is to disable MU-RTS TXS Trigger frames during the QoS period and is to solicit UL data from the wireless communication device using Basic Trigger frames.

25. The method of claim 18, wherein the SCS request frame comprises an element that includes a medium time field, the medium time field indicating an amount of time to access a wireless medium.

26. The method of claim 18, further comprising:
monitoring for the trigger frame based at least in part on the response frame.

* * * * *